US005151805A

United States Patent [19]

Takeda et al.

[11] Patent Number: 5,151,805

[45] Date of Patent: Sep. 29, 1992

[54] CAPACITIVELY COUPLED DRIVING METHOD FOR TFT-LCD TO COMPENSATE FOR SWITCHING DISTORTION AND TO REDUCE DRIVING POWER

[75] Inventors: Etsuya Takeda, Suita; Yutaka Nanno, Amagasaki; Seiichi Nagata, Sakai, all of Japan

[73] Assignee: Matsushita Electric Industrial Co., Ltd., Osaka, Japan

[21] Appl. No.: 617,883

[22] Filed: Nov. 26, 1990

[30] Foreign Application Priority Data

Nov. 28, 1989 [JP] Japan .................................. 1-308676

[51] Int. Cl.[5] ......................... G02F 1/133; G09G 3/36

[52] U.S. Cl. ....................................... 359/57; 359/85; 340/784

[58] Field of Search ................ 350/332, 333; 340/784, 340/805, 811

[56] References Cited

U.S. PATENT DOCUMENTS 4,393,380 7/1983 Hosookawa et al. ................. 359/57
4,432,610 2/1984 Kobayashi et al. ................. 350/333
4,818,981 4/1989 Oki et al. .............................. 340/784
4,909,062 3/1990 Kaneko et al. ....................... 340/784
4,955,697 9/1990 Tsukada et al. ....................... 359/57

FOREIGN PATENT DOCUMENTS 0112700 7/1984 European Pat. Off. ............ 340/784
0336570 10/1989 European Pat. Off. ............ 340/784
0373565 6/1990 European Pat. Off. ............ 340/784

*Primary Examiner*—Stanley D. Miller
*Assistant Examiner*—Tai V. Duong
*Attorney, Agent, or Firm*—Wenderoth, Lind & Ponack

[57] ABSTRACT

A driving method of a display apparatus for AC driving display materials such as liquid display and so on to the picture display by the use of an active matrix with switching elements of thin film transistors so that the output signal voltage of the signal driving circuit of the active matrix display apparatus is considerably reduced and the consumption power of the same driving circuit handling the analog signal may be reduced.

4 Claims, 17 Drawing Sheets even field odd field

CAPACITIVELY COUPLED DRIVING METHOD FOR TFT-LCD TO COMPENSATE FOR SWITCHING DISTORTION AND TO REDUCE DRIVING POWER

BACKGROUND OF THE INVENTION

The present invention generally relates to a driving method of a display apparatus for AC driving display materials such as liquid display and so on to effect the picture display by the use of active matrixes formed with switching elements and picture element electrodes of thin film transistors (hereinafter referred to as TFTs) and so on in a matrix shape. The present invention has for its object to provide a driving method of the display apparatus, which comprises the steps for reducing the driving power, improving the display picture quality, improving the driving reliability, and improving the brightness thereof.

Generally, the display quality of the active matrix liquid display apparatus has been greatly improved in recent years, and reaches the equivalent to that of a cathode-ray tube (CRT). When the TFT array which ensures the best picture quality in the liquid crystal display apparatus is used, a DC voltage which is inevitably generated by the parasitic capacity and so on of the display apparatus interior is generated. The difference ΔV between the electric potential Vt of the opposite electrode for AC driving the liquid crystal and the average central electric potential Vsc of the picture signal voltage is as follows in the case of no storage capacity:

$$\Delta V1 = Vsc - Vt = Cgd\,Vg/(Clc + Csd),$$

wherein the storage capacity of the display unit, the liquid crystal capacity, the capacity between the source and drain are respectively Cs, Clc, Csd in the display unit shown in FIG. 1, namely, the electrical potential change of the scanning signal of the TFT is defined as Vg.

Also, in the case of the existing storage capacity, the difference ΔV is defined as follows:

$$\Delta V2 = Vsc - Vt = Cgd\,Vg/(Cs + Clc + Csd)$$

Namely, $\Delta V1 > \Delta V2$.

The DC electrical potential difference ΔV gave applied influences upon the picture characteristics such as flicker of the picture image, sticking effect which is a memory of the picture image, stability with respect to the temperature, and so on. Especially when the storage capacity does not exist, the DC electrical potential difference becomes conspicuous. In order to remove the above described influences, the storage capacity becomes indispensable. Accordingly, the storage capacity is essential for eliminating the above mentioned bad influences, and at present a method for forming the storage capacity on the TFT array basic substrate may have the following case.

1) In a method of making electrode of the storage capacity with transparent electrodes, the construction and step of TFT arrays are complicated although the driving is simple, the area of the transparent electrode is large, and the bright display is provided.

2) It is made of metal of the gate electrode instead of the storage capacity electrode of the transparent electrode of the method 1). Although the construction of the array of TFTs is simple, with the driving method similar to the method 1) being possible, the area of the transparent picture element electrode becomes smaller, with a disadvantage that the open area ratio is smaller, thus resulting in the dark display apparatus.

3) The other method is to have the gate electrode and the electrode of the storage capacity in common use. Although as the characteristics, this method is simple in the step and the open area ratio becomes large, the large signal voltage is necessary, and the driving method of more consumption power is required.

In the known liquid crystal display apparatus using the TFT array with the storage capacity being built in, there has been no method of simultaneously satisfying the demands of more light, less flicker, with the construction being simpler and the consumption power being less. The TFT array of the method 3) among the above three methods may provide a liquid crystal display apparatus which is simple in construction and is large in the open area ratio, so that the development of driving method of for providing especially with the proper low consumption power has been desired.

According to the report of K. Suzuki: Euro Display 87 P107 (1987), there is a proposal of a method for employing a negative additional signal (Ve) to be applied after the scanning signal so as to completely compensate for the above described difference ΔV. But, in this method the picture signal voltage is large, so that the driving is not effected with the lower consumption power.

On the other hand, the present inventors have proposed a driving method of satisfying the above described demands at the same time in Japanese Patent Application Serial. Nos. 63-58465, and 63-313456. Namely, with this method, firstly, the output signal voltage of the signal driving circuit in the active matrix display apparatus is considerably reduced, thereby reducing the consumption power of the signal driving circuit handling analog signals. Secondly, the display picture quality is improved, and even in the AC driving for each field, the causes of generating the flicker is improved. Thirdly, the reliability of the display apparatus is improved. This is because the DC voltage which has been inevitably generated within the display apparatus is removed by the capacity coupling and so on through Cgd of the anisotropy . scanning signal of the liquid crystal. By the removing of the DC voltage, the image sticking effect phenomenon of the picture to be caused immediately after the fixed picture has been displayed is considerably improved.

However in the above described driving method, the picture signals which are the analog signals become less, but the scanning signals are complicated enough to require the more power supply, with a disadvantage that IC chips become bigger, and the consumption power on the scanning side increases.

SUMMARY OF THE INVENTION

Accordingly, an essential object of the present invention is to provide a driving method of the display apparatus comprising a step of reducing the driving power.

Another object of the present invention is to provide a driving method of the display apparatus comprising a step of improving the display picture quality.

Still another object of the present invention is to provide a driving method of the display apparatus comprising a step of improving the driving reliability.

A further object of the present invention is to provide a driving method of the display apparatus comprising a step of improving the brightness.

In accomplishing these and other objects, according to one preferred embodiment of the present invention, there provides a driving method of a display apparatus wherein picture element electrodes connected with a first wiring through capacities are arranged in a matrix shape, switching elements connected electrically to picture signal wirings and scanning signal wirings are connected to the above described picture element electrodes, and display materials retained between the above described picture element electrodes and the opposite electrode are driven in AC-driving, comprising the steps of: transferring a picture signal voltage to picture element electrodes during an "on" period of the switching element; feeding a modulation signal, which is equal in absolute value and is reversed in polarity for each field, to the first wiring during an "off" period of the switching elements, thereby varying the electrical potential of the picture electrodes; and applying voltage upon the display material with the variation of the electrical potential and the picture signal voltage being mutually piled up an/or being offset from each other.

With the above method, the modulation signal Ve is set so that the value ΔV* to be defined by the following equations:

$$\Delta V^* = VeCs/Ct$$

$$Ct = Cs + Cgd + Csd + Clc$$

may satisfy:

$$Vth \leqq \Delta V^* \leqq Vmax,$$

wherein the above described modulation signal is Ve, the storage capacity, capacity between gate and drain, the capacity between source and drain, capacity of the liquid crystal are respectively Cs, Cgd, Csd, Clc with the voltage range where the transmission ratio of the liquid crystal changes is Vmax instead of Vth. More desirably, to provide:

$$\Delta V^* = (Vmax + Vth)/2$$

the amplitude Vsig of the necessary signal voltage is made minimum by the adjustment of the modulation signal Ve.

Also, the modulation signal Ve is made variable and the value ΔV* is rendered to change, so that the function of the brilliance adjustment may be provided so as to provide pictures corresponding to the temperature change or the angle dependence.

Furthermore, the voltage of the "off" period of the thin film transistor (TFT) becomes either one of the voltages Voh or Vol different for each field period, so that the absolute value of the difference and the absolute value of the modulation voltage Ve may satisfy the relationship of:

$$|Ve| = |Voh - Vol|,$$

so that the necessary power supply voltage can be reduced.

When the switching element is, for example, a TFT (thin film transistor), the electrical potential change Vg of the scanning signal is caused through the capacity Cgd between the gate and the drain, resulting in that the value CgdVg/Ct is generated in the negative direction. In the present invention, the width Ve of between the positive and negative modulation signals with the absolute value being equal for each field and the polarity being inverted is given through the storage capacity Cs so as to cause the electrical potential change in the picture electrode only CsVe/Ct in the negative direction, only CsVe/Ct in the positive direction, and the electrical potential change CgdVg/Ct is piled up on each of the electrical potential changes. The relationship of these electrical potential changes may be set so as to satisfy the following equation. Namely, and in the negative direction:

and in the negative direction:

$$\Delta V(-) = (CsVe(+) + CgdVg)/Ct \quad (1)$$

and in the positive direction:

$$\Delta V(+) = (CsVe(-) - CgdVg)/Ct \quad (2)$$

When the relationship between the difference of the electrical potential Vt of constant opposite electrode and the average central electrical potential Vsc of the signal voltage, and the Vg is set in $$Vsc - Vt = CgdVg/Ct \quad (3)$$

the difference between the picture element electrical potential and the opposite electrode electrical potential Vt, namely, when the value of the ΔV* is more than a threshold value of the liquid crystal, one portion of the liquid crystal driving voltage is fed from the capacity coupling electrical potential, so that output amplitude of the picture signal driver is decreased, and the driving power may be reduced.

The concrete optimum opposite voltage is set so that the flicker component (for instance, 30 Hz component in the NTSC system) of the picture (desirably, one picture element unit) may become minimum.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
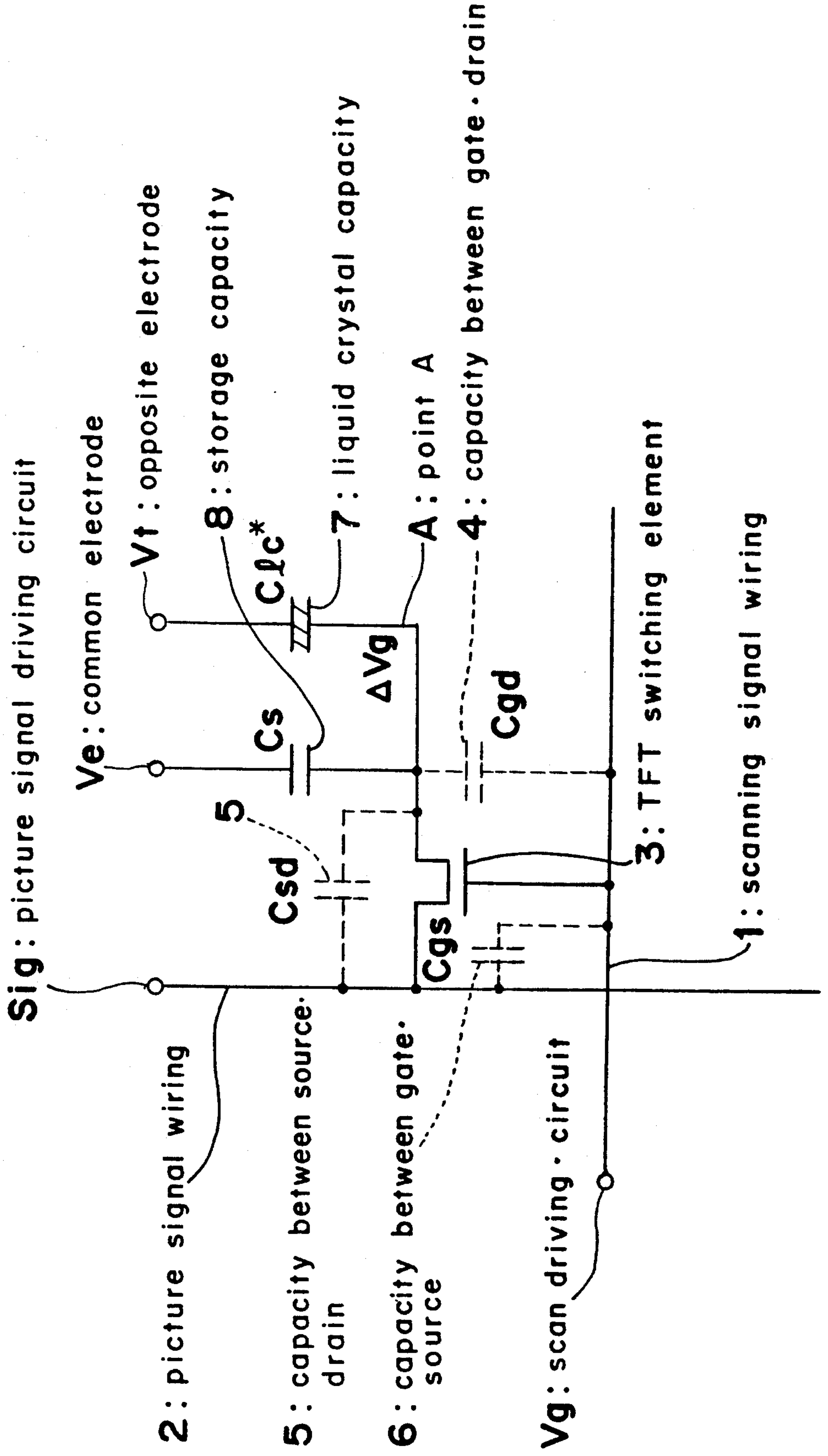
FIG. 1 is a circuit diagram showing the components for description of the principle of the present invention.

Before the description of the present invention proceeds, it is to be noted that like parts are designated by like reference numerals throughout the accompanying drawings.

Firstly, the theoretical background of the present invention will be described hereinafter.

FIG. 1 shows an electrical equivalent circuit of display elements of a TFT active matrix driving LCD. Each display element has a TFT 3 at the point of intersection between the scanning signal wiring 1 and the picture signal wiring 2. The TFT 3 has as parasitic capacities the capacity Cgd 4 between the gate and drain, the capacity Csd 5 between the source and drain and the capacity Cgs 6 between the gate and source. Furthermore, there are a liquid crystal capacity Clc* 7 and a storage capacity Cs 8 as capacities intentionally provided.

As a driving voltage externally upon each of these element electrodes, a scanning signal Vg is applied upon a scanning signal wiring 1, a picture signal voltage Vsig upon the picture signal wiring 2, a modulation signal Ve corresponding to the polarity of the picture signal equal in the absolute value, and different in the direction inverted for every each field upon one electrode of the storage capacity Cs, and a constant voltage Vt upon the opposite electrode of the liquid crystal capacity Clc*. The influences of the driving voltage appear upon the picture element electrode at an A point in FIG. 1 through each type of capacity provided parasitically or intentionally.

Figure 2:
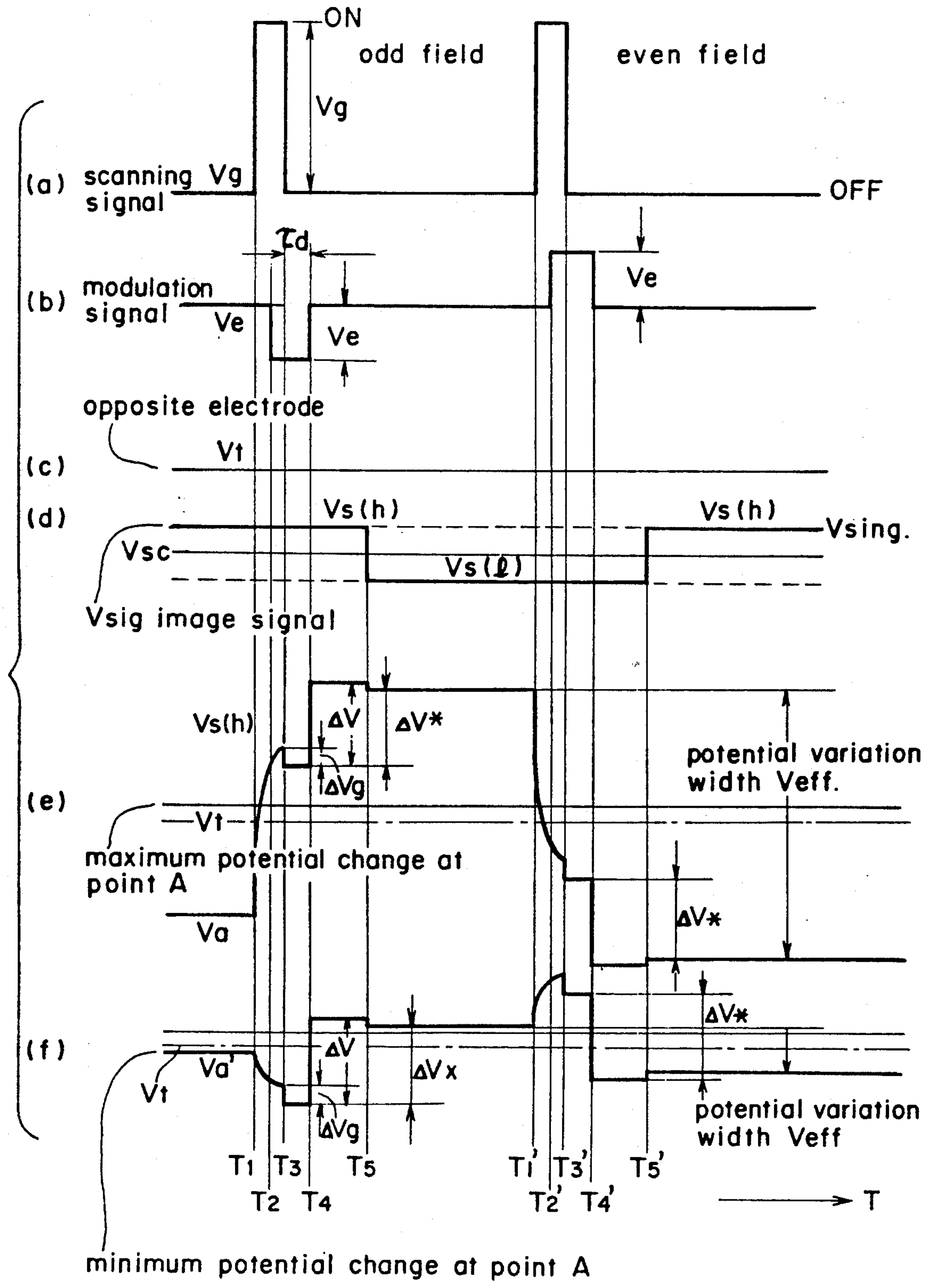
FIG. 2 and FIG. 4 are waveform charts showing the voltage waveforms to be applied upon the basic construction of FIG. 1, respectively.

If the signals Vg, Ve, Vt and Vsig shown in FIG. 2 (*a*) through (*d*) defined as the change component of the voltage related to a nth scanning line are respectively supplied to each point Vg, Ve, Vt or Vsig of FIG. 1, respectively the electrical potential changes of the picture element electrode depending upon the capacity coupling are expressed in the equations (4) and (5) at the respective even and odd fields, but, except for the electrical potential change components at the A point caused by the conduction from the picture signal wiring with the TFT being on):

$$\Delta V(-) = (CsVe + CgdVg \pm CsdVsig)/Ct \qquad (4)$$

$$\Delta V(+) = (CsVe - CgdVg \pm CsdVsig)/Ct \qquad (5)$$

-continued $$Ct = Cs + Cgd + Csd + Clc = Cp + Csd + Clc = \Sigma C$$

A second term of the above equations (4) and (5) is an electrical potential change that the scanning signal Vg causes in the picture element electrode through the parasitic capacity Cgd of the TFT.

A first term of the above equations (4) and (5) expresses the effect of the first modulation voltage. A third term of the above equations (4) and (5) shows the electrical potential change that the picture signal voltage causes in the picture element electrode through the parasitic capacity. The capacity Clc is the capacity of the liquid crystal which change under the influences of the dielectric anisotropy as the orientation condition of the liquid crystal changes by the size of the signal voltage Vsig. In this case, although the capacity Cgs is a capacity between the gate and signal electrode, both the scanning signal wiring and the picture signal wiring are driven by the low impedance power supply, and the coupling thereof does not have influences directly upon the display electrode electric potential, so that it is neglected.

If the relationship between the difference of the electric potential Vt of a certain opposite electrode and the average central electrical potential Vsc of the signal voltage, and the voltage Vg is set in, as defined by the equation (3), $$Vsc - Vt = CgdVg/Ct,$$

the scanning signal Vg can compensate for the DC electric potential variation applied upon the picture element electrode electrical potential through the parasitic capacity Cgd so that the liquid crystal is AC-driver with generating a DC component of electrical current to the scanning signal having some of parasitic capacity. When the difference ΔVg between the picture element electrical potential and the opposite electrode electrical potential Vt, namely, the value of the electrical potential change ΔV* equal at the even and odd fields is more than a threshold value voltage Vth of the liquid crystal, one portion of the liquid crystal driving voltage Vl may be fed from the capacity coupling electric potential Ve, so that the output amplitude Vsig of the picture signal driver may be decreased and the driving power may be reduced. In this manner, although the DC voltage is not supplied to the liquid crystal, it is possible to effect symmetrical AC driving operation, wherein the electrical potentials of both of the positive and negative sides are symmetrical with each other.

When the voltage Vsig gives a signal to be inverted for each scanning line, the effect of the third term CsdVsig in the equation (5) is offset at each field.

As a first effect, the electrical potential ΔV* to be caused in the picture electrode can be made equal between the positive and negative values with respect to the opposite electrode in each even and odd field. A second effect is that the DC electrical field is not caused between the electrical potentials of the picture element electrode and the opposite electrode in two fields as the signals of polarities being reversed in positive and negative are given to the electrical potential of the opposite electrode for each field in the driving method of the present invention. As the present invention is directed to a driving method of not giving the DC voltage to the liquid crystal, then driving method has an advantageous in reliability.

Further, a third effect is that a voltage parameter Ve which may be set optionally on the side of the display apparatus is provided. Thus, if the voltage Ve is controlled, the electrical potential variation $\Delta V^*$ appearing in the picture element electrode can be set at an optional size. If the voltage $\Delta V^*$ is set at more than the threshold value voltage Vth of the liquid crystal, the voltage Vsig can be made smaller. Further, the brilliance adjustment given through the piling up conventionally upon the signal voltage Vsig to correct the temperature dependability and the visual field angle dependability of the liquid crystal can be controlled by the modulation electrical potential Ve of the storage capacity electrode. If the voltage Vsig is made smaller, the output amplitude of the picture signal driving circuit for controlling the analog signal is made smaller, so that the consumption of power of the same circuit can be reduced in proportion to the square of the amplitude. In the case of the color display, it leads similarly to the power saving of a chroma IC handling the analog signals. On the other hand, the voltage Ve is a digital signal, and the chroma IC is controlled to be on/off. Therefore, if the modulation signal Ve is applied, it leads to the power saving in the general driving system composed of a complementary type MOSIC.

The schematic values of the above described capacity and voltage parameter using the apparatus of the embodiment to be described later are instantly as follows.

Cs=0.68 pF, Clc(h)=0.226 pF, Clc(1)=0.130 pF, Cgd=0.059 pF, Csd=0.001 pF, Vg=15.5 V, Ve=+4.4 V, Vt 32 0 V, Vsig=±2.0 V.

When the above described parameters are taken into consideration, the third terms of the equations (4) and (5) may be substantially neglected.

FIGS. 2(*e*) and 2(*f*) show respectively the electrical potential changes of the picture element electrode at a point A of FIG. 1 when the driving signals Vg, Vsig and, the modulation signal Ve have been inputted into each electrode of the display element of FIG. 1. If the scanning signal Vg enters in the equation of (T=T1) when, for example, the signal Vsig is the value Vs(h) as in the solid line of the (d) drawing in the odd field, the TFT conducts to charge the electrical potential Va of the A point until it becomes equal to the value Vs(h). When the TFT is on before T=T2, the modulation potential voltage is set at at given value beforehand. Before the TFT becomes off in T=T2, the signal of Ve is kept given in the negative direction. Then, when the scanning signal Vg disappears in T=T3, the change of the Vg appears as the variation of electrical potential of the $\Delta$Vg at the A point through the capacity Cgd. Furthermore, when the signal Ve changes in the positive direction in the T=T4 after the delay time $\tau$d, the influence appears in the positive direction displacement of the electrical potential Va as shown in FIGS. 2(*e*) and 2(*f*). Thereafter, the electrical potential variation $\Delta$V of the A point appears similarly as the Vsig changes from the Vs (h) to Vs(1) in the T=T5. The capacity coupling component combined is shown as the width of potential variation of $\Delta V^*$ in FIGS. 2(*e*) and 2(*f*).

Thereafter, when the scanning signal Vg is inputted in the even field, the TFT charges the A point as long as the low level Vs(1) of the Vsig. When the TFT turns off, the capacity coupling electrical potential $\Delta V^*$ appears as in the above description. When the Vsig is at a high level and the Ve is at a low level, or, reversely the Vsig is at a low level and the Ve is at a high level, the change width Veff in the picture element electrode electrical potential becomes almost $2\Delta V^* + 2$Vsig as shown in FIG. 2(*e*) with respect to the picture signal amplitude Vsig as shown with the real line of FIG. 2(*d*), with both of them becoming mutually piled up. In other words, the output amplitude of the picture signal output IC can be reduced only by $2\Delta V^*$. (Hereinafter a case where the signals Ve and Vsig are in the above described phase relationship is referred to an opposite phase).

Figure 3:
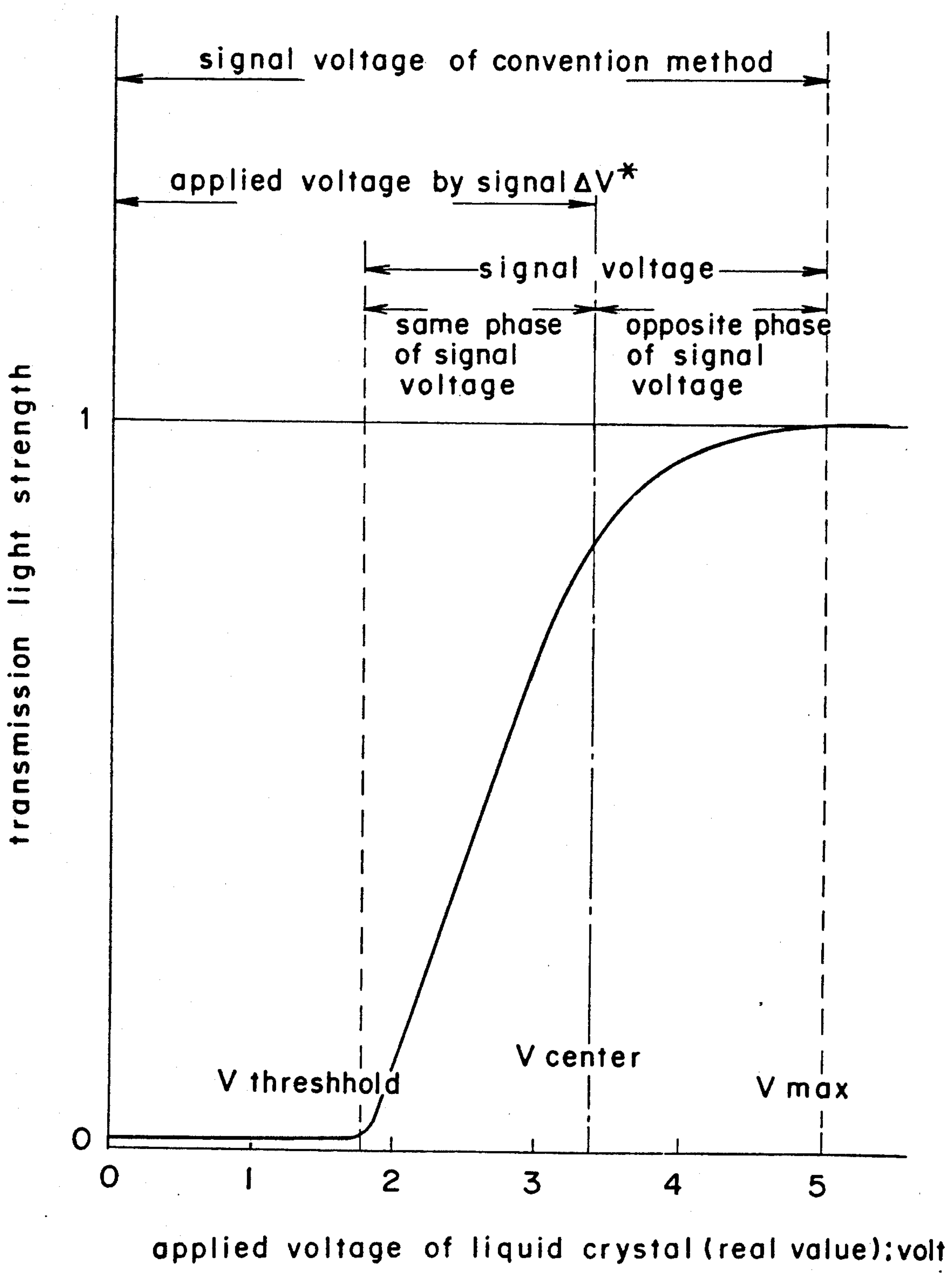
FIG. 3 is a graph showing the relationship between the transmission light strength of the liquid crystal and the application voltage, and the effect of the voltage of the present invention.

On the other hand, in the case of FIG. 2(*f*), when the Vsig is in such phase relationship as shown with the dotted line of FIG. 2(*d*) with respect to the modulation signal Ve (hereinafter, referred to as the same phase), the change width of the picture element electrode electrical potential at the A point becomes almost ($2\Delta V^* - 2$ Vsig), the signals of $\Delta V^*$ and Vsig mutually offset each other at one portion thereof. The opposite electrical potential Vt is displaced by $\Delta$Vg with respect to the center Vsc of the signal voltage, so that the voltage with respect to the liquid crystal can be made symmetrical in the even and odd fields. FIG. 3 shows the relationship of the applied voltage of the liquid crystal against the transmission light strength, and shows the example of the voltage range for controlling the transmission light by the signals of $\Delta V^*$ and Vsig. The voltage range for changing the transmission light of the liquid crystal is from the threshold value voltage Vth of the liquid crystal to the saturation voltage Mmax. When the signal $\Delta V^*$ is set at more than the Vth, the maximum necessary signal voltage becomes (Vmax−Vth) when the phase control is not effected. If the applied voltage by the signal $\Delta V^*$ is set at the center of signal voltage VCT to control the amplitude of the signal voltage and the phase, the maximum necessary signal amplitude voltage may be reduced by approximately {(Vmax−Vth)/2}, whereby the effect of reducing the picture signal amplitude which is one of the object of the present invention above described is provided as described hereinabove.

Figure 4:
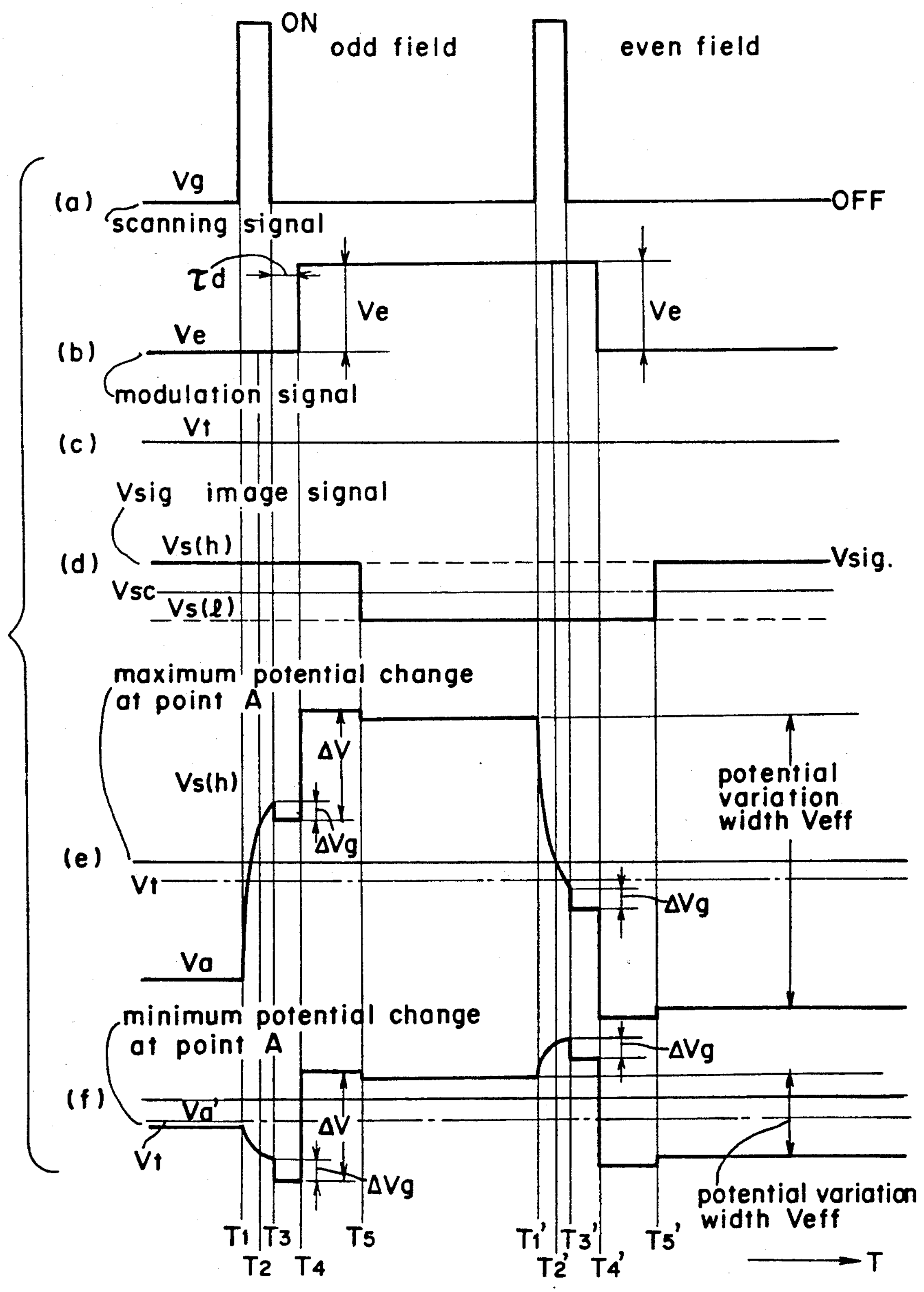

A driving method with the waveforms of FIG. 2(*b*) being further improved is shown in FIG. 4. In FIG. 4 the basic difference point to the method of FIG. 2 is that the signal Ve is set respectively at different voltage between T=T4 of the odd field and T1', and between the T=T4' of the even field and T1. Namely, the modulation signal is applied which is changed in the positive direction by the Ve in the T=T4 as shown in the dotted line circle of FIG. 4(*b*) and is decreased in the negative direction by the Ve in the T=T4'.

Now, when the 3.3 V is required as the effect of the modulation electrical potential by the $\Delta V^*$ as shown in FIG. 3, the amplitude of Ve in the T=T3 has only to be set.

The present invention will be described hereinafter with reference to the embodiments.

EMBODIMENT 1

Figure 5:
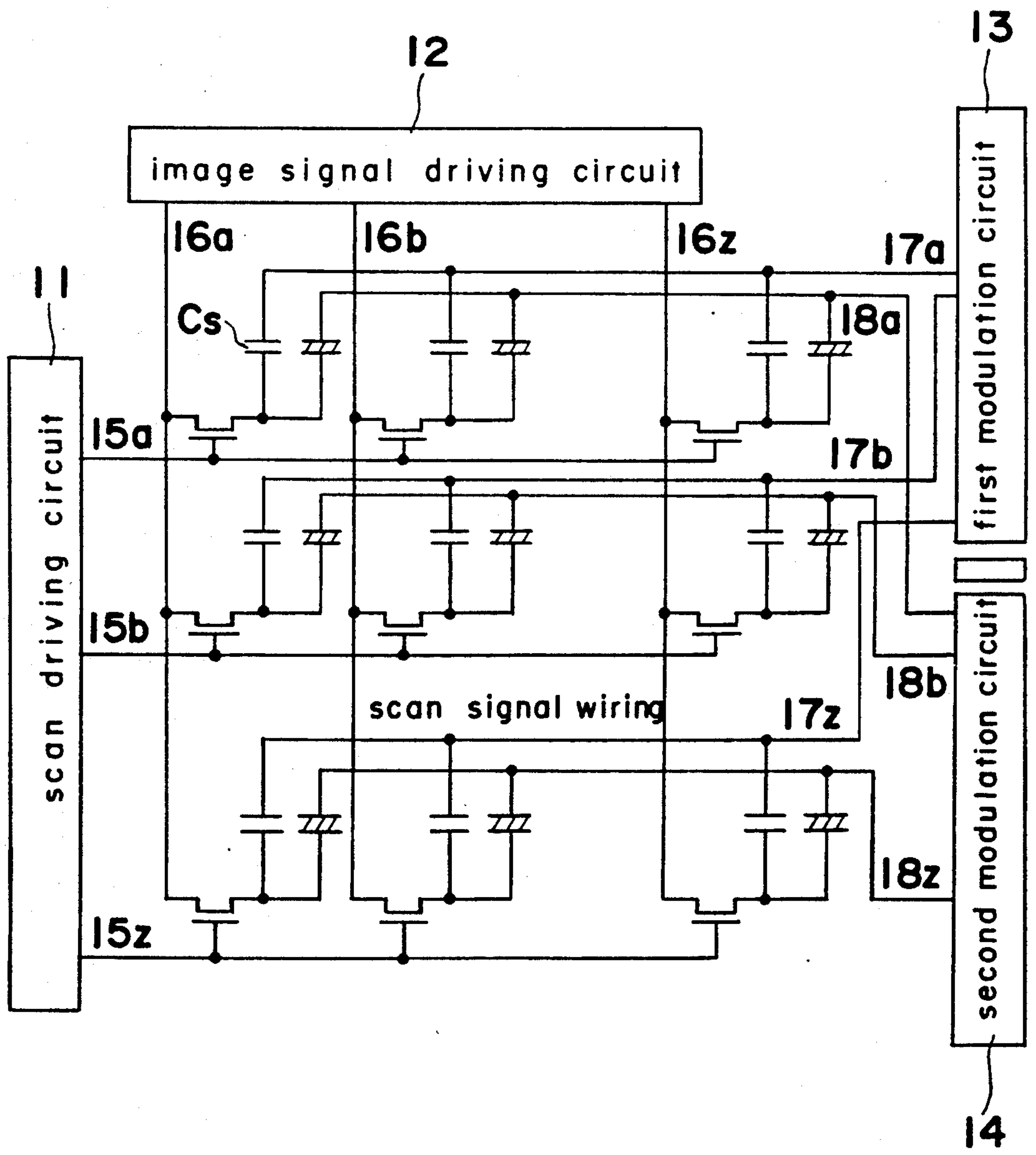
FIG. 5 is a circuit diagram showing the basic construction of the apparatus in accordance with first, second and third embodiments of the present invention.
Figure 6:
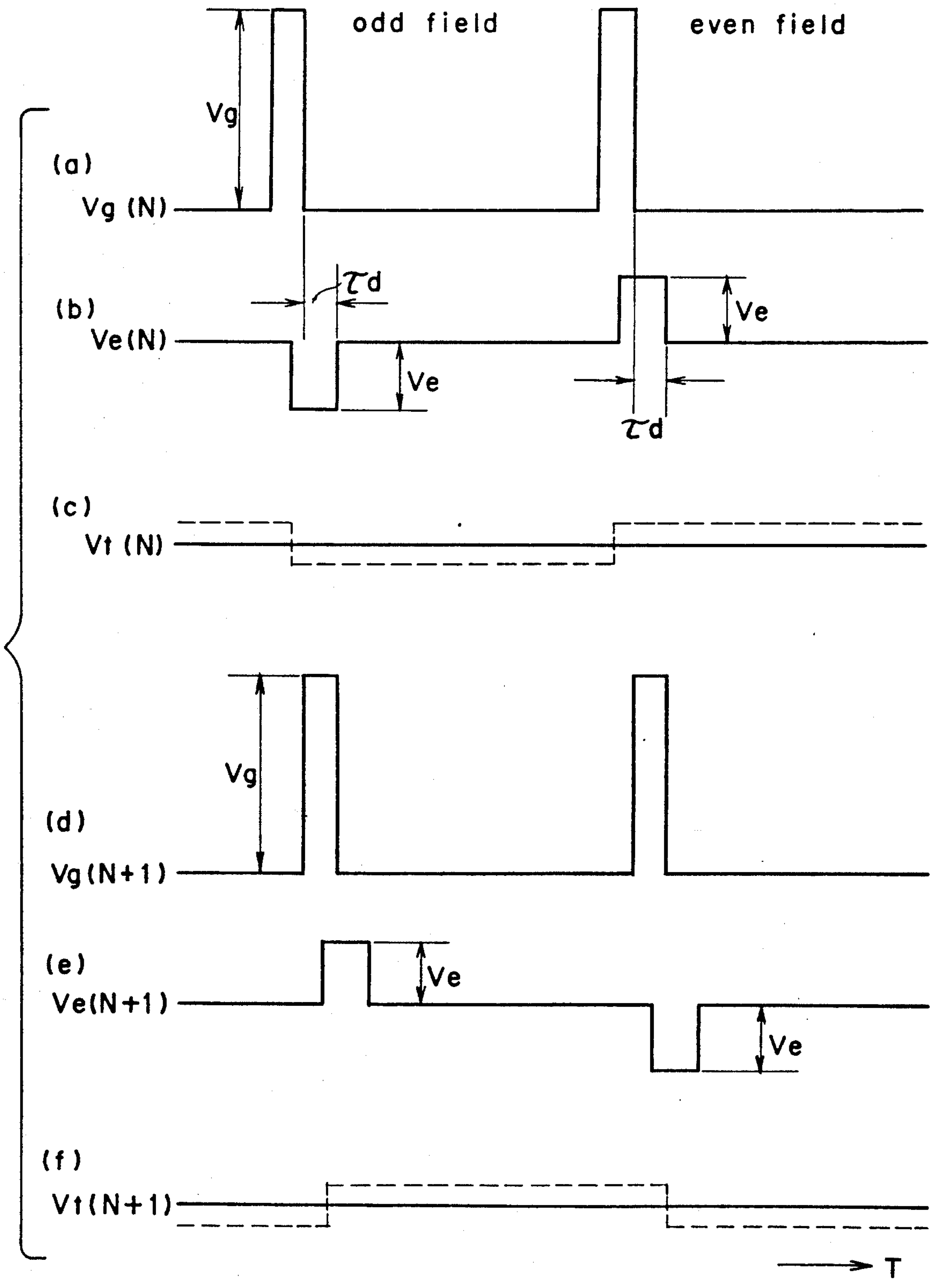
FIG. 6 is a waveform chart showing the applied voltage waveforms of the first embodiment.

Referring now to FIG. 5, there is shown a circuit diagram of the apparatus in a first embodiment of the present invention, which includes a scanning driving circuit 11, a picture signal driving circuit 12, a first modulation circuit 13, a second modulation circuit 14, a diploring material being disposed between the circuits 13 and 14, scanning signal wirings 15*a*, 15*b*, . . . 15*z*, picture signal wirings 16*a*, 16*b*, . . . 16*z*, common electrodes 17*a*, 17*b*, . . . 17*z* of the storage capacity Cs, opposite electrodes 18a, 18b, . . . 18z of the liquid crystal. As described hereinabove, in the present embodiment, the storage capacity and the opposite electrode are separated, formed for each of the scanning signal wirings, and the modulation signal is also applied, corresponding to each of the scanning signal wirings. A time chart of the scanning signal Vg and modulation signal Ve is shown in FIG. 6. FIG. 6 shows the scanning signal Vg and modulation signal Ve with respect to the Nth scanning signal wiring and the N+first scanning signal wiring. The mutual relationship among the modulation signal, picture signal, the $\Delta V^*$, and the Vsig is substantially equivalent to that of FIG. 2. Namely, the polarity of the picture signal and modulation signal is reverted for every each field.

In the present embodiment, the whole area may be driven from the black to the white with the flicker being less and the output amplitude of the signal voltage being slightly 3 Vpp, so that the display of good contrast may be effected. It is noted that the brilliance adjustment of the display picture is effected with the amplitude $\Delta V^*$ of the modulation signal being changed.

EMBODIMENT 2

Figure 7:
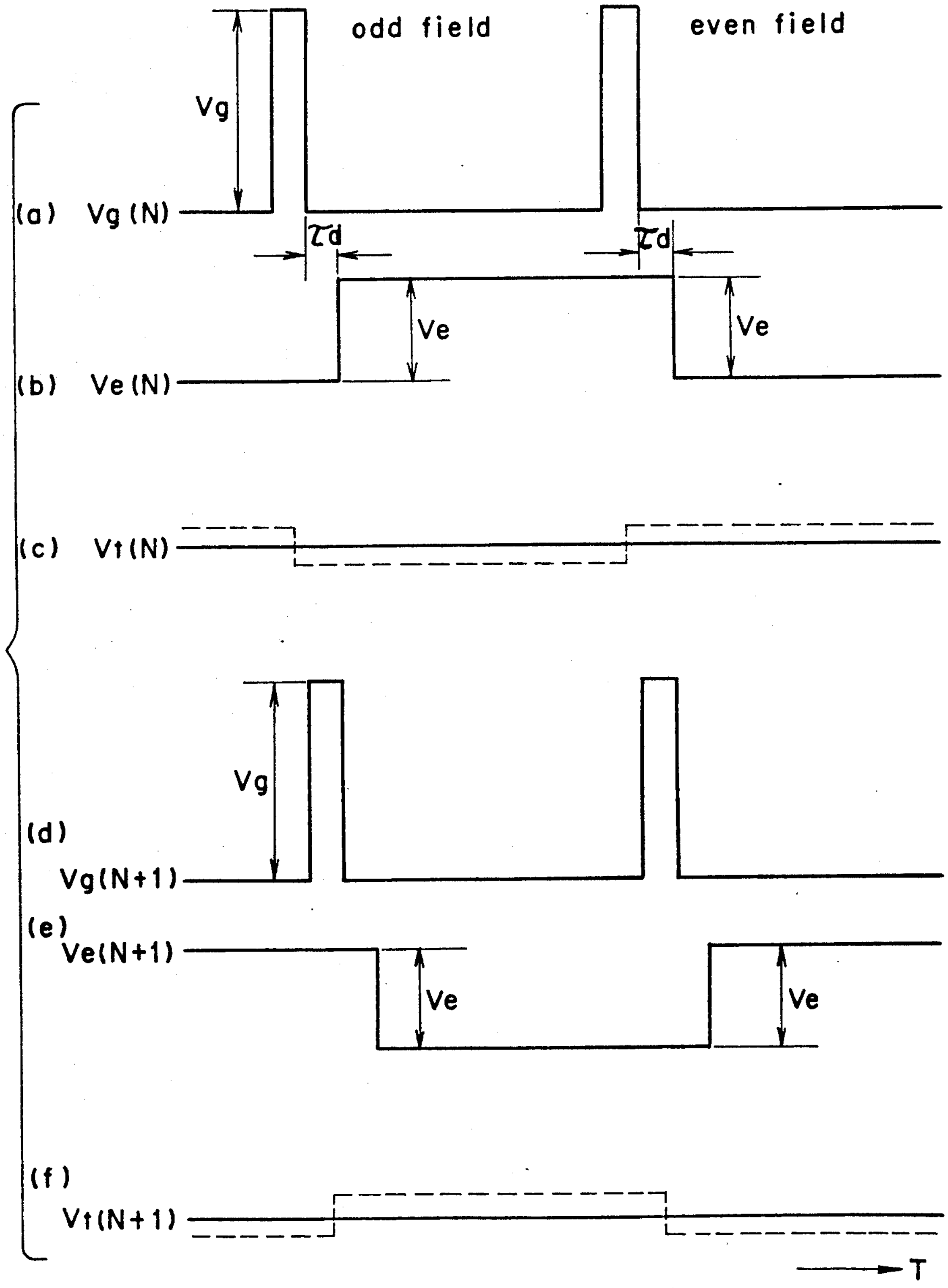
FIG. 7 is a waveform chart showing the applied voltage waveforms of the second embodiment.

In the circuit of FIG. 5 which is the same as the embodiment 1, the voltage waveform of the Ve shown in FIG. 7 is different from that of the first embodiment. The electrical voltage which is different in the Ve is set in the even field and the odd filed.

In the present embodiment, in addition to the effect of the first embodiment, the level of the Ve is reduced from 3 to 2, and the necessary number of the power supplies can be reduced.

EMBODIMENT 3

The voltage waveforms of the circuits Vg and Ve to be used is the same as those in the embodiments 1 and 2. The voltage waveforms of the Vt are adapted to be reversed like broken lines in each field in accordance to each scanning line. During the "on" period of the TFT, it is adapted to be reversed in a direction opposite to the direction along which the Ve changes after the FTF off. In this manner, the modulation voltage of the Ve can be made smaller than in the embodiments 1 and 2.

EMBODIMENT 4

Figure 8:
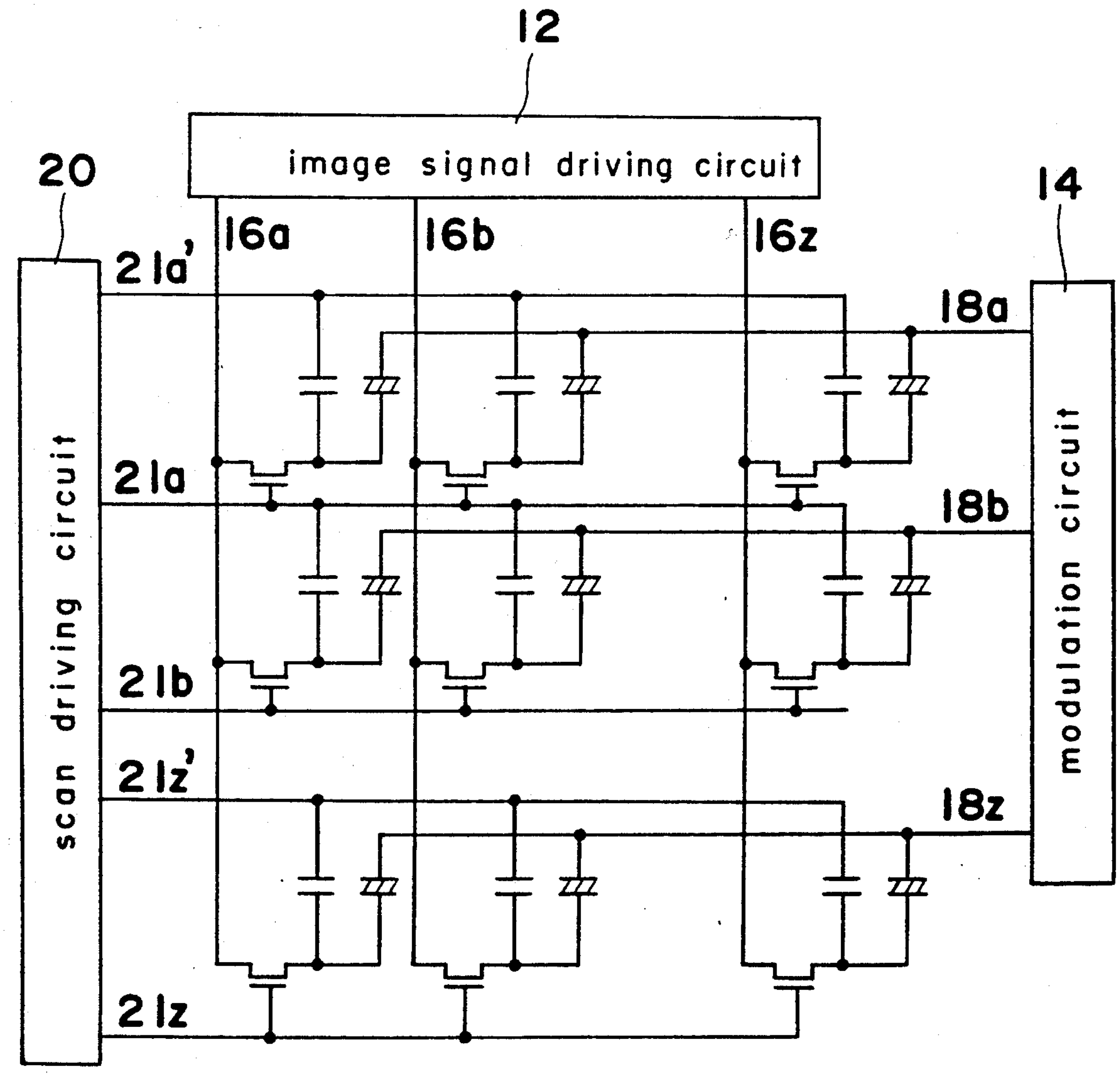
FIG. 8 is a circuit diagram showing the basic construction of the apparatus in accordance with a fourth embodiment of the present invention.
Figure 9:
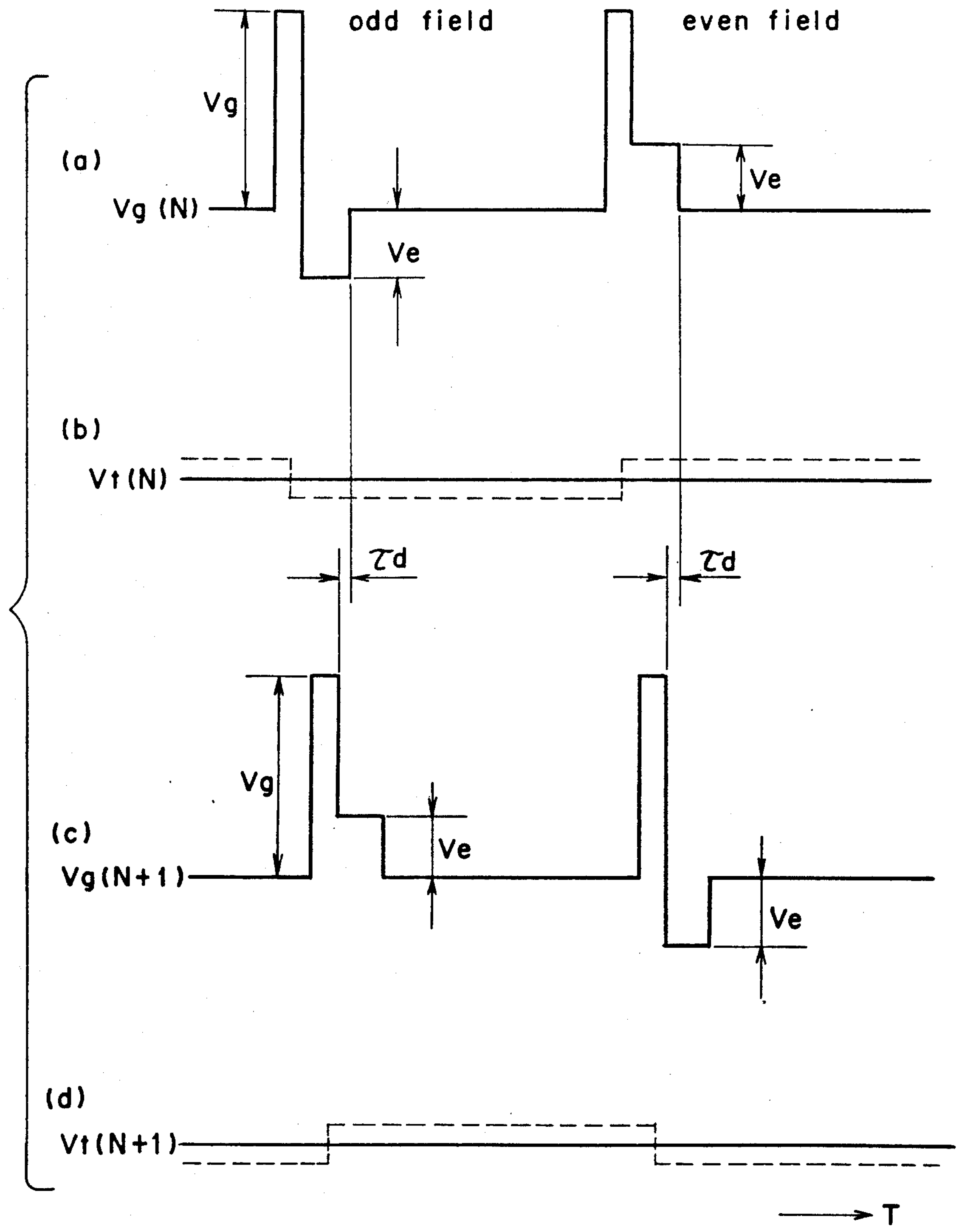
FIG. 9 is a waveform chart showing the applied voltage waveforms of the fourth embodiment.

The circuit of the fourth embodiment are shown in FIG. 8. The voltage waveforms to be applied upon the present circuit are shown in FIG. 9, which includes a first scanning signal wiring 21a, a common electrode line 21a' of the storage capacity to which the first scanning signal wiring 21a is attached, a final scanning signal wiring 21z, and a a front-stage scanning signal wiring 21z' with respect to the wiring 21z. The present embodiment is different from the embodiments 1 and 2 in that the common electrode of the storage capacity Cs is formed by the use of the scanning signal wiring of the front stage. Accordingly, the modulation signal is applied upon the scanning signal wiring of the front stage. As shown in FIG. 9, the polarity of the modulation signal applied upon the Nth scanning signal wiring is inverted after the scanning to the N+first scanning signal wiring has been completed (delay time $\tau d$).

The polarity inversion of the modulation signal may be overlappingly effected about the Nth and the N+first scanning signal wirings and about in the even and odd fields, or may be effected only about the fields. Although the electrical potential change amount into the positive direction of the modulation signal and the electrical potential amount in the negative direction are the same in value, they are adapted to be variable.

The effect of the present embodiment is similar to the first embodiment.

EMBODIMENT 5

Figure 10:
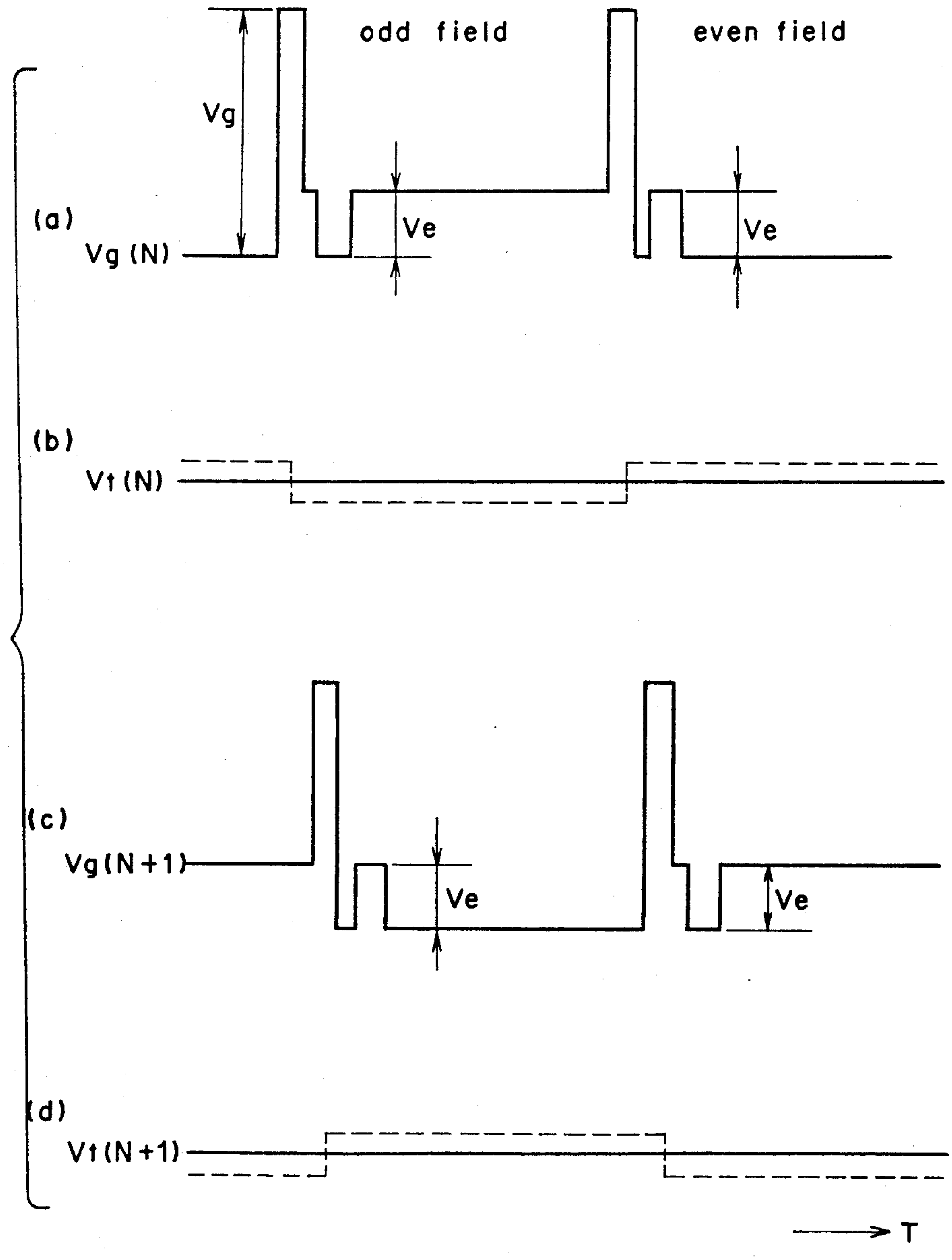
FIG. 10 is a waveform chart showing the applied voltage waveforms of a fifth embodiment.

The display apparatus of FIG. 8 which is the same in construction as the embodiment 4 is driven with the voltage waveforms shown in FIG. 10. The value after the modulation of the voltage waveform Vg which has been the same in the embodiment 4 is different for every each field. If the waveforms are such voltage waveforms like the Vg shown in FIG. 10, the effect similar to that of the embodiment 4 is obtained, and further, the gate amplitude necessary for driving becomes smaller.

EMBODIMENT 6

Figure 11:
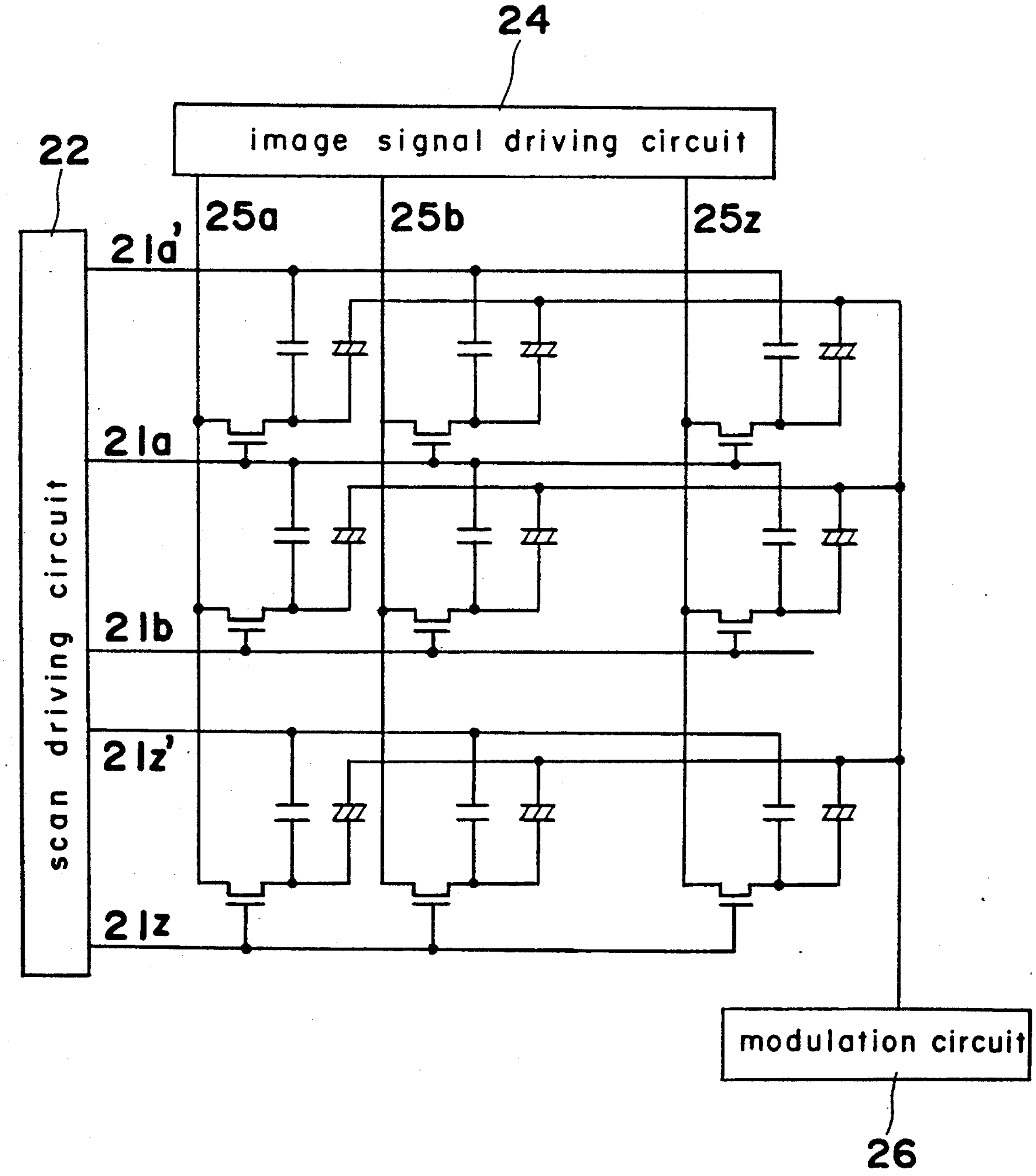
FIG. 11 is a circuit diagram showing the basic construction of an apparatus in accordance with a sixth embodiment of the present invention.
Figures 12A, 12B:
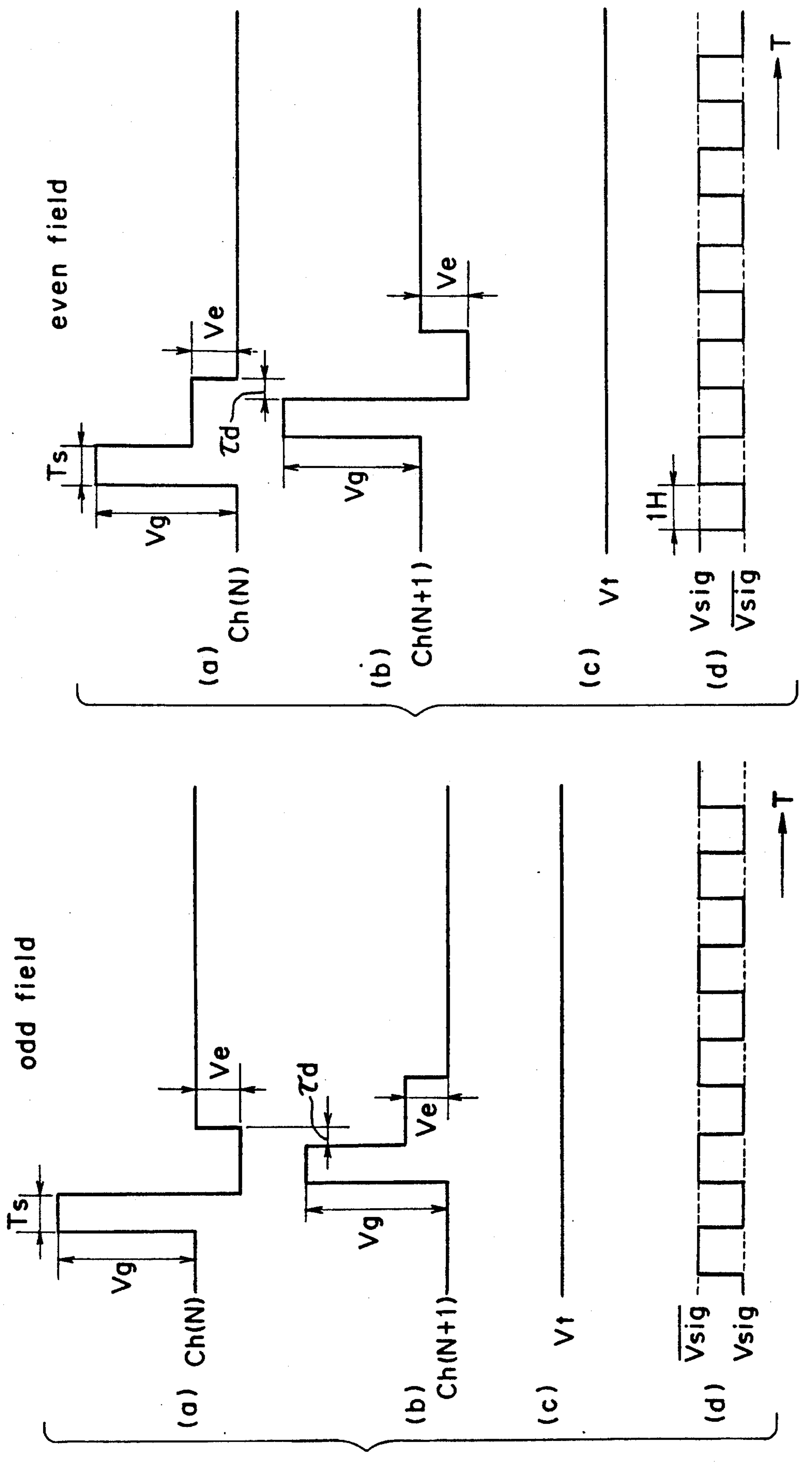
FIGS. 12(A) and 12(B) are waveform charts showing the applied voltage waveforms of the sixth embodiment.

The circuit of the sixth embodiment is shown in FIG. 11. The voltage waveforms to be applied in the present embodiment is shown in FIGS. 12(A)–12(B).

Although the present embodiment is the same as the above described embodiment 4 in that the modulation signals are overlappingly applied upon the scanning signal wiring, the present embodiment is different from the respective previous embodiments in that the opposite electrodes are not divided for each of the corresponding scanning signal wirings, the electrical potential is the same across the whole display apparatus, and the electrical polarity between the picture element electrode and opposite electrode has been changed for every one scanning period (1H). The voltage waveforms to be applied as shown in FIGS. 12(A)–12(B) include a scanning driving circuit 22, a picture signal driving circuit 25, a second modulation signal generating circuit 26, picture signal wirings 25a, 25b, . . . 25z, voltage wave forms Ch (N)·Ch (N+1) to be applied upon the Nth and the N+first scanning signal wiring, an opposite electrode electric potential Vt, and a picture signal voltage wave form Vsig. Also, FIGS. 12(A)–12(B) show the difference (polarity inversion) in the voltage waveform between the odd field and the even field for AC driving the liquid crystals.

The high waveform Vg in the waveform Ch(N)·Ch(N+1) respectively controls the scanning signal, and the electrical potentials Ve and −Ve immediately after the scanning signal. The application time Ts of the scanning signal makes it possible to effect the variable control in one scanning period or less. After the scanning of the next stage (Ch (N+1)) has been completed, the modulation signal has been applied after the delay time $\tau d$. Even in the TFT array of the simple construction in FIG. 11, the driving power can be reduced. As the electrical potential of the opposite electrode is made constant as the display apparatus, the number of the power supply outputs can be reduced.

EMBODIMENT 7

Figure 13B:
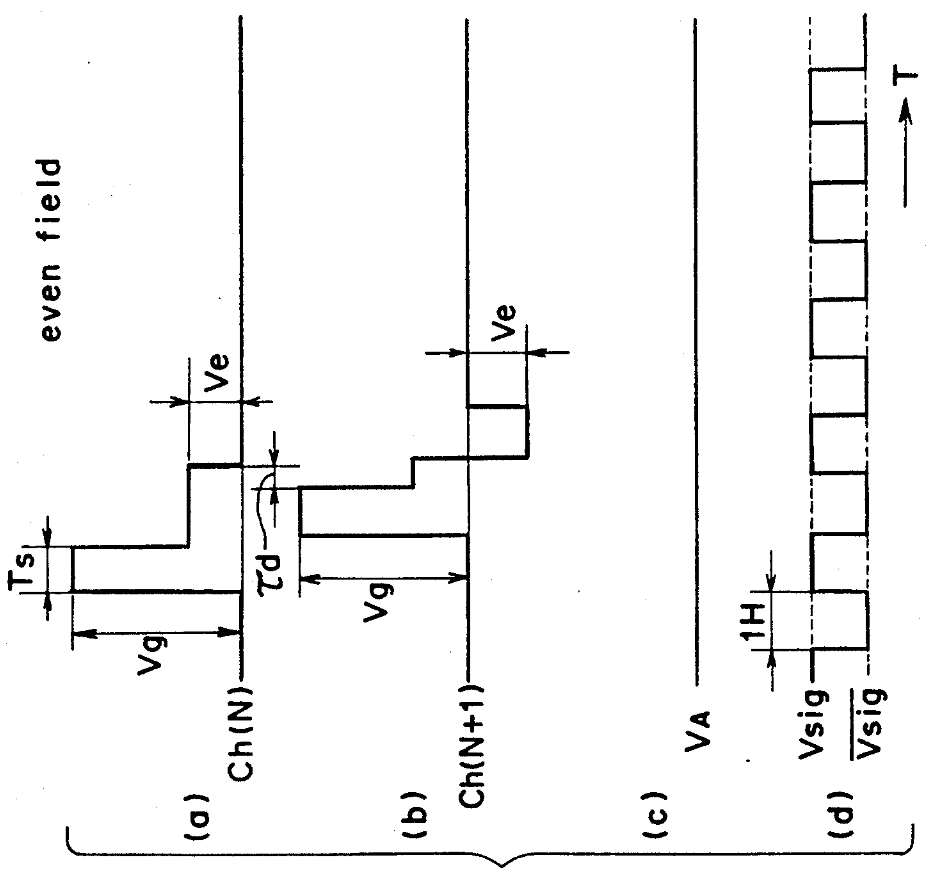
FIGS. 13(A) and 13(B) are waveform charts showing the applied embodiment waveforms of a seventh embodiment.
Figure 13A:
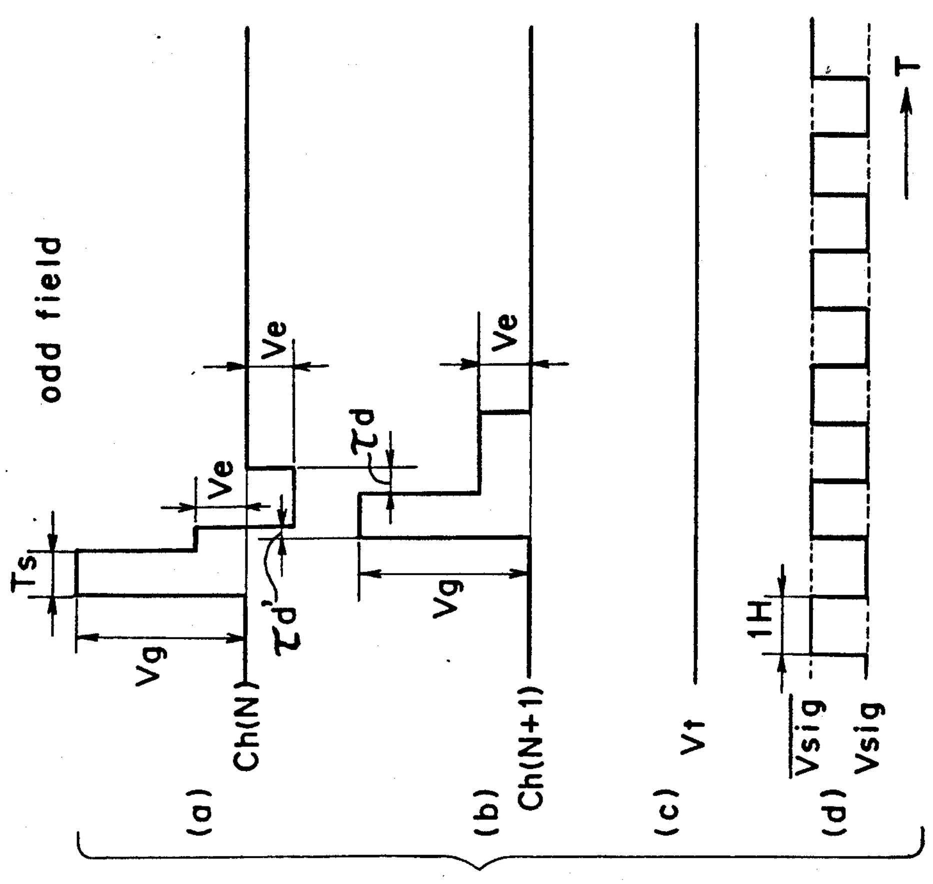

The voltage waveforms to be applied in the present embodiment is shown in FIGS. 13(A)–13(B) with the use of the circuit of FIG. 11. FIGS. 13(A)–13(B) show that the applied voltage waveforms Ch (N), Ch (N+1) with respect to the scanning line of FIGS. 12(A)–12(B) of the sixth embodiment of the present invention has been changed. Namely, in the Ch (N) of the odd field, the voltage is maintained at the value of +Ve after the TFT on period Ts, and the TFT of the voltage Ch (N+1) of the scanning line of the next stage has been turned on, and then the voltage is kept at the value of −Ve after the τd' (0≦τd'<Ts). In the even field, the Ch (N+1) has the voltage waveform similar to the Ch (N) of the odd field. By the use of the voltage waveform of FIGS. 13(A)–13(B), the voltage variation to be given to the picture element electrode of the next stage at the TFT on of the scanning line of the Ch (N) can be made the same in the respective fields. As a result, the flickers have been reduced as compared with the waveforms of FIGS. 12(A)–12(B) used.

EMBODIMENT 8

Figure 14A:
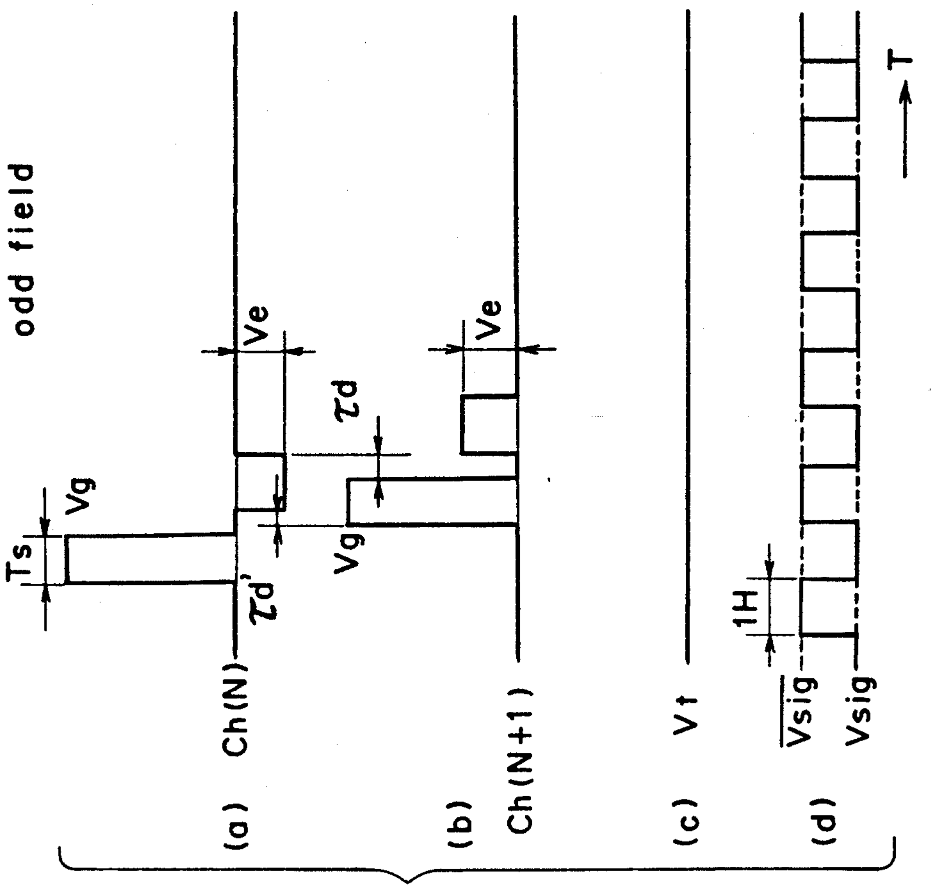
FIGS. 14(A) and (14)B are waveform charts showing the applied voltage waveforms of an eighth embodiment.
Figure 14B:
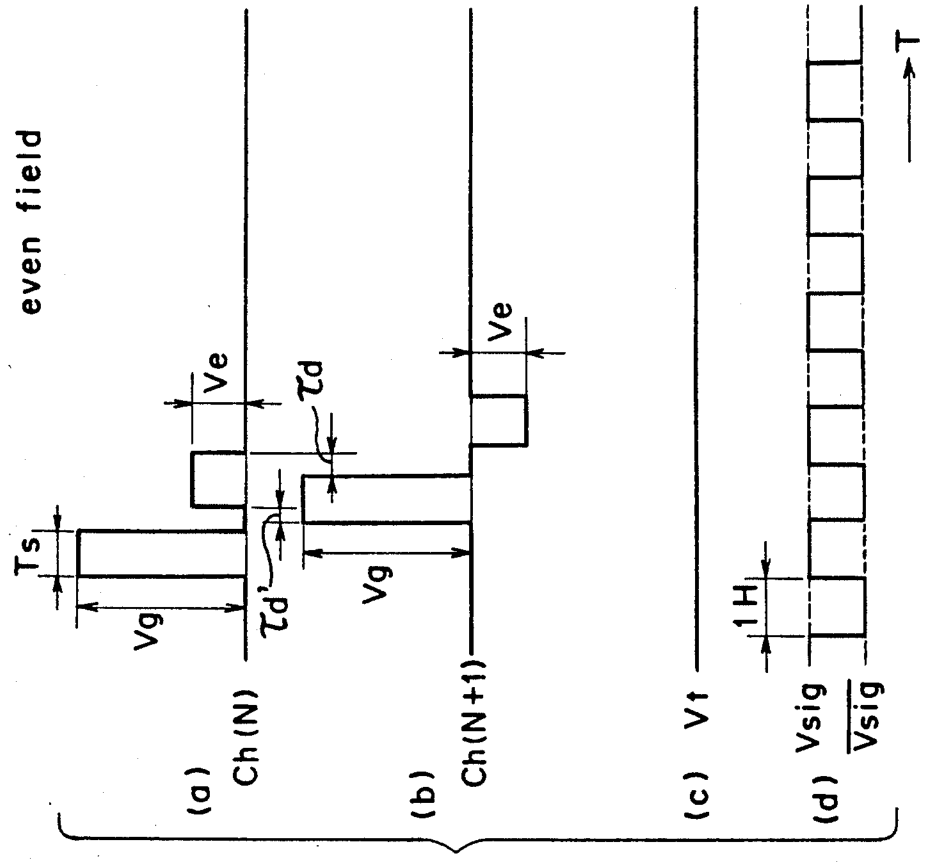

By the use of the circuit of FIG. 11, the voltage waveforms to be applied in the present embodiment is shown in FIGS. 14(A)–14(B). FIGS. 14(A)–14(B) are another example where the applied voltage waveforms Ch (N), Ch (N+1) with respect to the scanning line of FIGS. 12(A)–12(B) of the sixth embodiment of the present invention have been changed. Namely, in the Ch (N) of the odd field, after the TFT on period Ts has been passed, the voltage is kept at 0 level. After the TFT of the voltage Ch (N+1) of the scanning line at the next stage has been turned on, the voltage is adapted to be the value of −Ve after the τd' (0>τd'<Ts). On the other hand, in the Ch (N) of the even field, after the TFT on period Ts has been passed, the voltage is maintained at 0 level. After the TFT of the voltage Ch (N+1) of the scanning line of the next stage has been turned on, the voltage is adapted to be the value of +Ve after the τd' (0≦τd'<Ts). The Ch (N) of the odd field and the even field Ch (N+1), and the Ch (N) of the even field and the odd field CH (N+1) are the same voltage waveforms, respectively. By the use of the voltage waveforms of FIGS. 14(A)–14(B), the voltage variation to be given to the picture element electrode of the next stage at the time of the TFT on of the scanning line of the Ch (N) can be made the same at every each field. As the result, the flicker is reduced as compared with the waveforms of FIGS. 12(A)–12(B).

The embodiments 7 and 8 show the other embodiments of the embodiment 6. It has been confirmed that in these embodiments, the same effect as that of the embodiment 6 is obtained.

EMBODIMENT 9

Figure 15B:
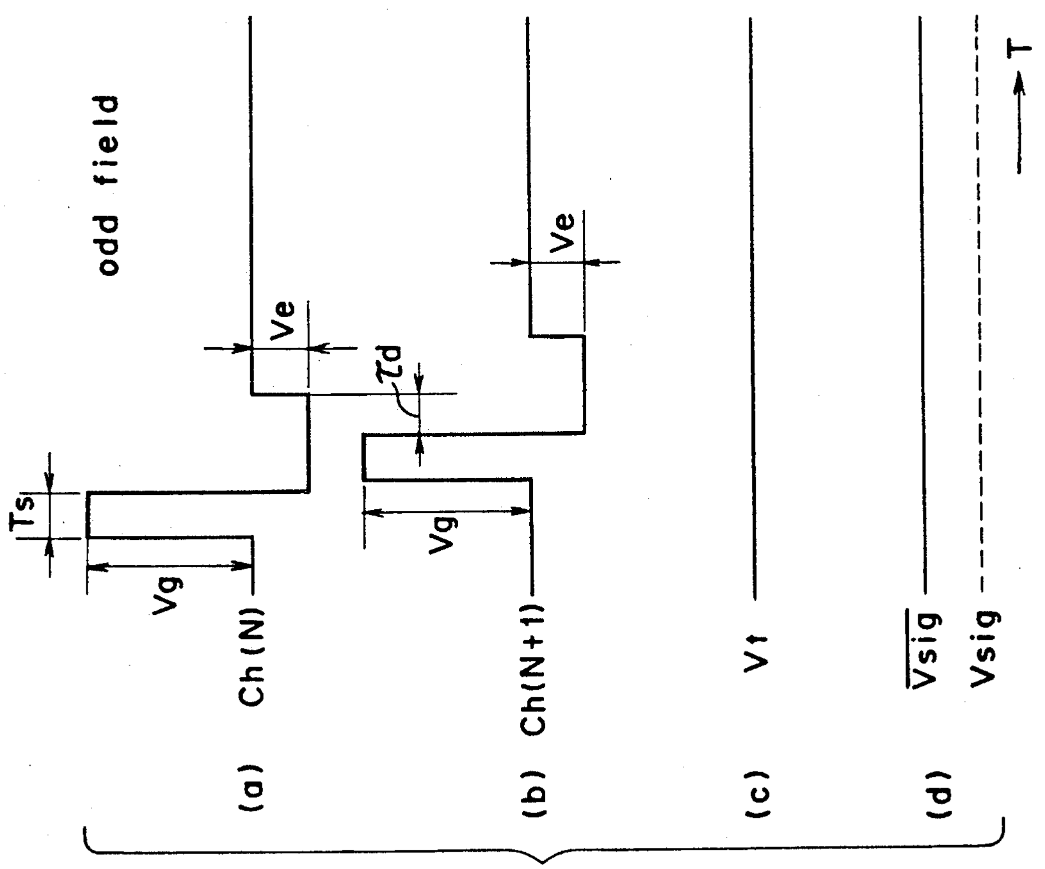
FIGS. 15(A) and 15(B) are waveform charts showing the applied voltage waveforms of a ninth embodiment.
Figure 15A:
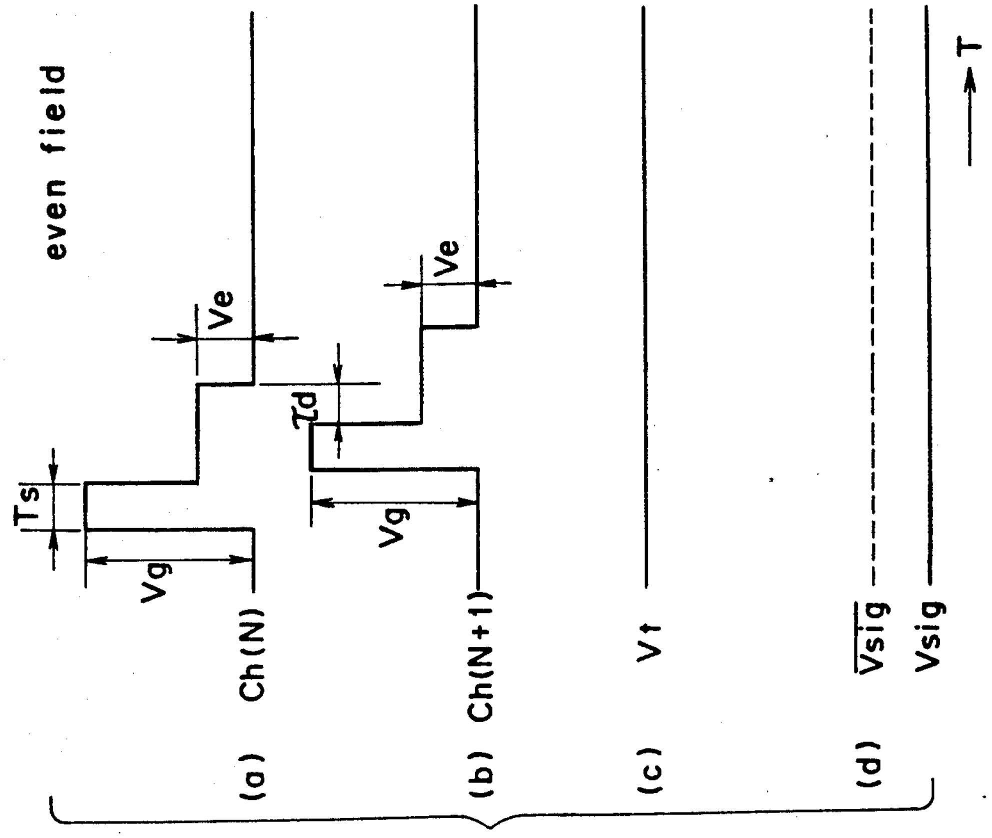

By the use of the circuit of FIG. 11, the voltage waveforms to be applied in the present embodiment are shown in FIGS. 15(A)–15(B). The present invention has a construction similar to the embodiment 6 of the present invention except for that is reversed in the polarity of the signal voltage with respect to each scanning line, and namely, the signal voltage which is reversed in the polarity of the voltage for each H is given. But, in the present embodiment, in the same field, the polarity of the signal voltage Vsig is constant. The polarity of the modulation voltage Ve to be given to the gate voltage is constant in the same field in accordance with the signal voltage. As compared with the embodiment 6, the frequency of the signal voltage is smaller, so that the consumption power for the driving operation can be made less.

EMBODIMENT 10

Figure 16B:
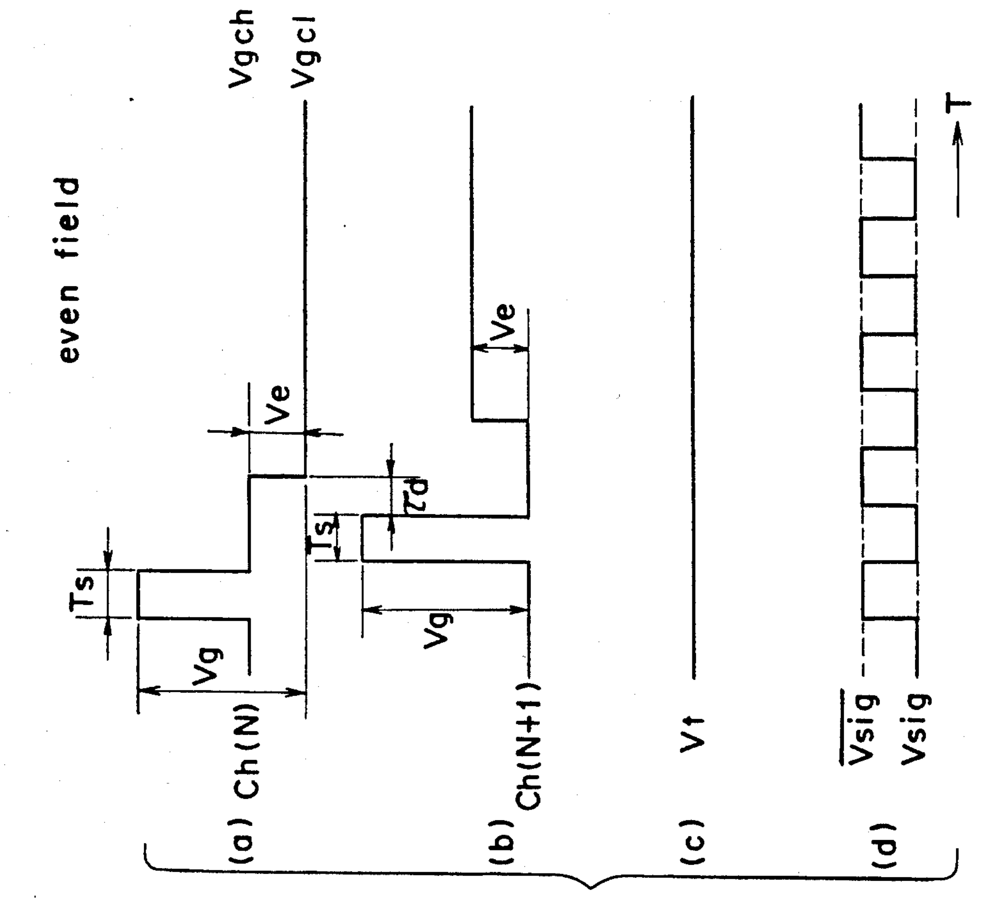
FIGS. 16(A) and 16(B) are waveform charts showing applied voltage waveforms of a tenth embodiment.
Figure 16A:
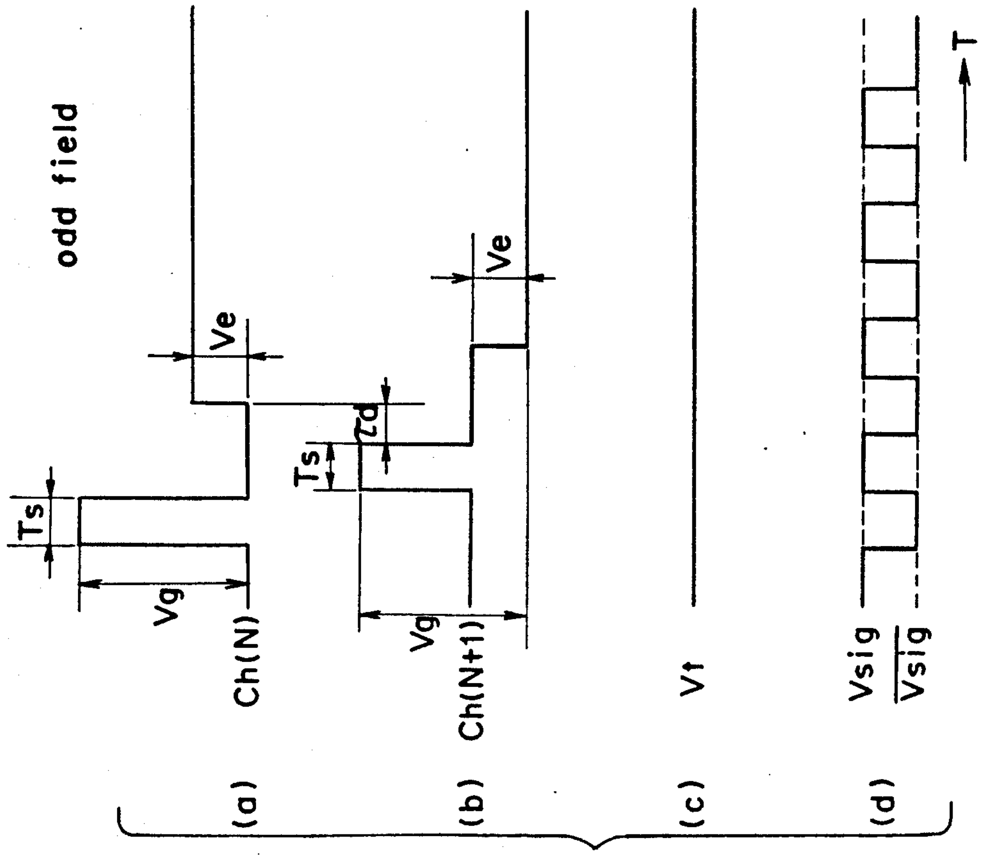

By the use of the circuit of FIG. 11, the voltage waveforms to be applied in the present embodiment are shown in FIGS. 16(A)–16(B). The gate voltage waveforms of FIGS. 12(A)–12(B) used in the embodiment 6 requires the power supply of 4 levels, while in FIGS. 16(A)–16(B) of the present embodiment, the gate voltage waveforms requires the power supply of three levels. Namely, in the Ch (N), the gate voltage becomes the value of Vg, and to turn off the TFT, the voltage of V01 is removed, the change is effected into V0h after τd'+Ts+τd, and the voltage as it is is retained. In the next field, the change is effected into the signal Vg so as to turn on the TFT. After the time Ts, it becomes V0h again, and it changes into V01 after the τd'+Ts+τd. In the present embodiment the number of the power supplies necessary for the gate voltage waveforms is reduced, so that the consumption power by the gate driving can be reduced.

EMBODIMENT 11

Figure 17B:
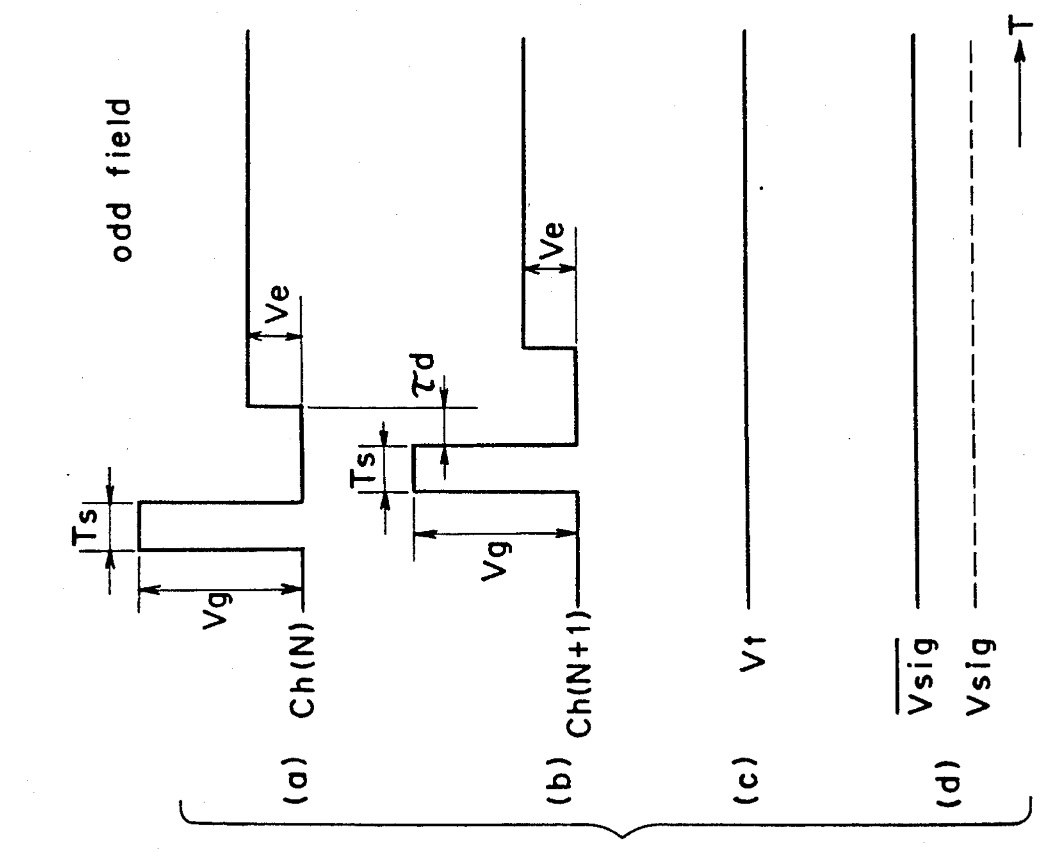
FIGS. 17(A) and 17(B) are waveform charts showing the applied voltage waveforms of an eleventh embodiment.
Figure 17A:
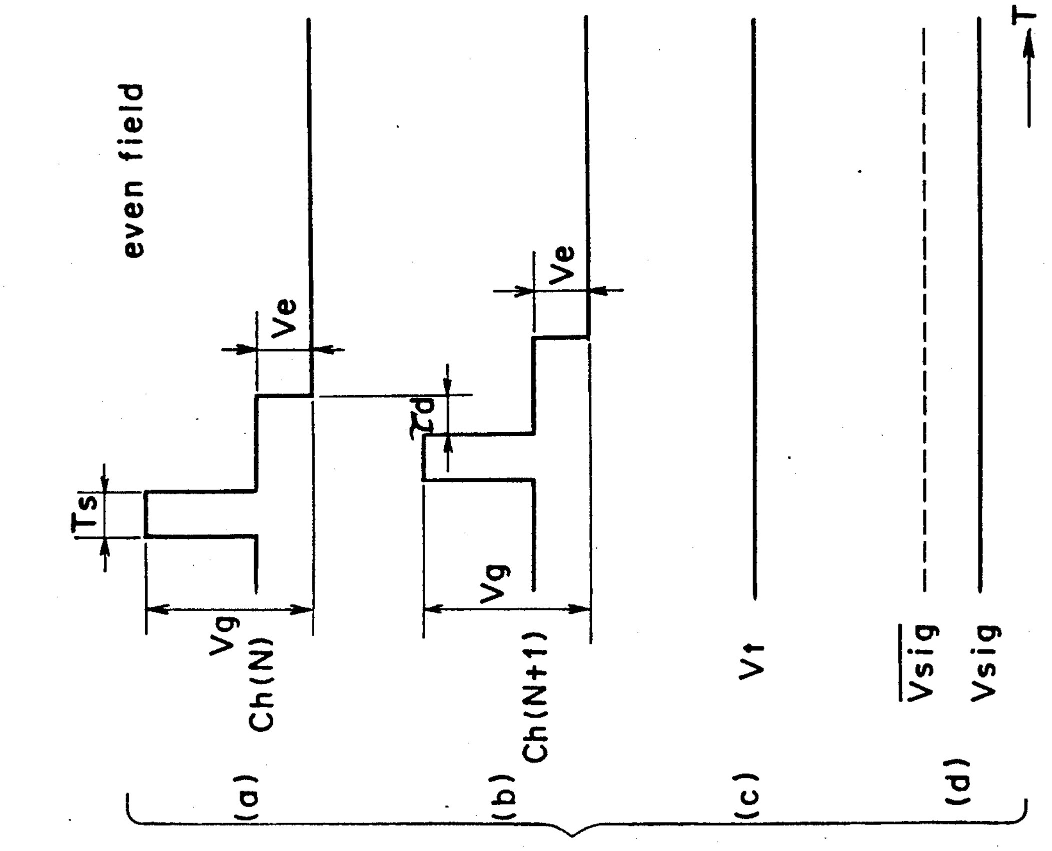

The voltage waveforms to be applied in the present embodiment by the use of the circuit of FIG. 11 are shown in FIGS. 17(A)–17(B). The embodiment 10 of the present invention is reversed in the polarity of the signal voltage with respect to the respective scanning lines, and, namely, the signal voltage which is reversed in the polarity of the voltage is given for every each of 1H. But, in the present embodiment, the polarity of the signal voltage Vsig is constant in the same field. The polarity of the modulation voltage Ve to be given to the gate voltage in accordance with the signal voltage is made constant in the same field. As the frequency of the signal voltage is smaller as compared with the embodiment 10, the consumption power for driving operation can be made smaller. Also, as compared with the embodiment 10, the voltage of the picture element electrical potential with respect to the source signal electric potential, and the gate electrical potential is provided in symmetry between the even field and odd field. Although it is not the so-called flicker free driving operation, where the polarity of the signal voltage is reversed for each line, the flicker can be smaller. Also, as compared with the embodiment 10, the necessary gate amplitude can be made smaller, which is advantageous for IC adoption.

As clear from the above described description, the present invention has following considerable effects.

First, by the piling up of the threshold value voltage portion of the liquid crystal and the brilliance adjustment voltage upon the electrical potential of the picture element electrode through the storage capacity electrode, only the necessary minimum picture signal voltage has to be transferred to the picture signal wiring. Accordingly, the output signal voltage of the signal driving circuit of the active matrix display apparatus is considerably reduced so that the consumption power of the same driving circuit handling the analogue signal can be reduced. Furthermore, when the present invention is used for the color display, the output amplitude of the chromer IC can be also reduced so as to save the power of the same circuit. It becomes possible to reduce the driving power as the whole display apparatus. On the other hand, the reduction of the amplitude of the output signal voltage makes it easier to manufacture the signal driving circuit, now that the higher density of the display is demanded all the more, and the signal driving circuit has to be made higher in frequency. Furthermore, the region where the linearity of the signal amplifier is good may be used, with a secondary advantage that the display quality may be improved.

Secondly, the display quality has been improved. Even in the AC driving operation for each field as in the embodiment 11, the items for causing the flickers can be removed. Also, in the embodiments 10 and 11, the number of the power supplies necessary for the gate voltage may be reduced in addition to the above advantageous.

In the above description, the present invention has been described by way of the liquid crystal display apparatus, and the conception of the present invention may be applied even in the driving operation of the other plate display apparatus.

As is clear from the foregoing description, according to the arrangement of the present invention, the display apparatus which is reduced in consumption power, improved in picture quality, and in reliability, and bright can be achieved at the same time, with the industrial effects being larger.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed being included therein.

What is claimed is:

1. In a method for driving a display apparatus comprising matrix-arranged picture element electrodes each connected to a first wiring through a storage capacity, each picture electrode being connected to a thin film transistor which is electrically connected to a picture signal wiring and a scanning signal wiring, and liquid crystal material hold between each picture electrode and an opposite electrode and being driven by an alternative current voltage, the improvement thereof comprising the steps of:

- transferring a picture signal voltage to the picture element electrode during an "on" period of the thin film transistor;
- feeding a modulation signal which is equal in absolute value and is different in polarity for every field to the first wiring during an "off" period of the thin film transistor to change the voltage of the picture element electrode;
- loading a voltage across the display material by adding to, or substracted from, the changed voltage of the picture element electrode and the voltage of the picture signal; and
- keeping at a constant voltage the difference between an average central voltage of picture signal voltage Vst and a voltage Vt of the opposite electrode.

2. The driving method for the display apparatus as defined in claim 1, wherein the first wiring is connected to an adjacent scanning wiring, and the voltage of a scanning signal during the "off" period of the thin film transistor is changed differently from a voltage Voh to a voltage Vo1 for every field period, in the condition of the absolute value of difference between the voltages Voh and Vo1 and the absolute value of a voltage Ve of the modulation signal being satisfied by the equation:

$$|Ve| = |Voh - Vo1|.$$

3. The driving method for the display apparatus as defined in claim 1, wherein a voltage difference Vg between the "on" voltage value and "off" voltage value of a scanning signal applied to the thin film transistor relating to the difference between the average central voltage Vsc of the picture signal voltage and the voltage Vt of the opposite electrode is satisfied by the following equation, wherein the storage capacity, a liquid crystal capacity, and a capacity between the source and drain and the gate and drain of the thin film transistor are respectively expressed by Cs, Clc, Csd, and Cgd:

$$Vsc - Vt = Cgd\ Vg/(Cs + Clc + Csd + Cgd).$$

4. The driving method for the display apparatus as defined in claim 2, wherein a voltage difference Vg between the "on" voltage value and "off" voltage value of a scanning signal applied to the thin film transistor relating to the difference between the average central voltage Vsc of the picture signal voltage and the voltage Vt of the opposite electrode is satisfied by the following equation, wherein the storage capacity, a liquid crystal capacity, and a capacity between the source and drain and the gate and drain of the thin film transistor are respectively expressed by Cs, Clc, Csd, and Cgd:

$$Vsc - Vt = Cgd\ Vg/(Cs + Clc + Csd + Cgd).$$

* * * * *